US012692659B2

(12) United States Patent
Matsuda et al.

(10) Patent No.: US 12,692,659 B2
(45) Date of Patent: Jul. 28, 2026

(54) OIL-RESISTANT AGENT AND OIL-RESISTANT COMPOSITION

(71) Applicant: DAIKIN INDUSTRIES, LTD., Osaka (JP)

(72) Inventors: Michio Matsuda, Osaka (JP); Hirotoshi Sakashita, Osaka (JP); Nozomi Yamaguchi, Osaka (JP); Tetsuya Uehara, Osaka (JP); Daisuke Noguchi, Osaka (JP); Shun Shibata, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 459 days.

(21) Appl. No.: 18/134,126

(22) Filed: Apr. 13, 2023

(65) Prior Publication Data

US 2023/0250589 A1 Aug. 10, 2023

Related U.S. Application Data

(63) Continuation of application No. PCT/JP2021/038108, filed on Oct. 14, 2021.

(30) Foreign Application Priority Data

Oct. 15, 2020 (JP) ................................ 2020-174147
Sep. 1, 2021 (JP) ................................ 2021-142572

(51) Int. Cl.

| | |
|---|---|
| ***D21H 21/16*** | (2006.01) |
| ***C09D 5/00*** | (2006.01) |
| ***C09D 103/02*** | (2006.01) |
| ***C09D 103/06*** | (2006.01) |
| ***C09D 103/10*** | (2006.01) |
| ***D21H 19/12*** | (2006.01) |

(52) U.S. Cl.

CPC ............... *D21H 21/16* (2013.01); *C09D 5/00* (2013.01); *C09D 103/02* (2013.01); *C09D 103/06* (2013.01); *C09D 103/10* (2013.01); *D21H 19/12* (2013.01)

(58) Field of Classification Search

CPC . D21H 21/16; C08L 3/04; C08L 33/08; C08L 33/10; C08L 33/14; C08F 220/34; C08F 220/20

See application file for complete search history.

(56) References Cited

U.S. PATENT DOCUMENTS

| | | |
|---|---|---|
| 2009/0104431 A1 | 4/2009 | Kishida et al. |
| 2021/0164165 A1 | 6/2021 | Yamamoto et al. |
| 2022/0081842 A1 | 3/2022 | Uehara et al. |

FOREIGN PATENT DOCUMENTS

| | | | |
|---|---|---|---|
| JP | 09-263047 | A | 10/1997 |
| JP | 11-158794 | A | 6/1999 |
| JP | 2004-238518 | A | 8/2004 |
| JP | 2005-029940 | A | 2/2005 |
| JP | 2005-029943 | A | 2/2005 |
| JP | 2013-176983 | A | 9/2013 |
| JP | 2013-237941 | A | 11/2013 |
| JP | 2014-025163 | A | 2/2014 |
| JP | 2014-141750 | A | 8/2014 |
| JP | 2016-199827 | A | 12/2016 |
| JP | 2019-052413 | A | 4/2019 |
| JP | 2019-073660 | A | 5/2019 |
| JP | 2020-066805 | A | 4/2020 |
| JP | 2020-122250 | A | 8/2020 |
| JP | 2021-046522 | A | 3/2021 |
| WO | 2005/071163 | A1 | 8/2005 |
| WO | 2013/015323 | A1 | 1/2013 |
| WO | 2020/054856 | A1 | 3/2020 |
| WO | 2020/241709 | A1 | 12/2020 |

OTHER PUBLICATIONS

Kathan, Western Michigan University Natural Polymer Barrier Coatings for Oil and Grease Resistance (Year: 2018).*
Extended European Search Report issued Feb. 14, 2025 in European Application No. 21880199.1.
Communication dated Nov. 22, 2024 issued by the European Patent Office in application No. 21880199.1.
International Preliminary Report on Patentability dated Apr. 27, 2023 with a Translation of the Written Opinion of the International Searching Authority in Application No. PCT/JP2021/038108.
International Search Report for PCT/JP2021/038108 dated Dec. 28, 2021 [PCT/ISA/210].

* cited by examiner

*Primary Examiner* — Catherine S Branch
*Assistant Examiner* — Olga Lucia Donahue
(74) *Attorney, Agent, or Firm* — Sughrue Mion, PLLC

(57) ABSTRACT

An oil-resistant agent and an oil-resistant composition, which are capable of imparting excellent oil-resistance to paper. The oil-resistant composition contains a polysaccharide (1) and an oil-resistant polymer (2). The polysaccharide (1) is preferably starch. The oil-resistant polymer (2) preferably has (a) a repeating unit formed from an acrylic monomer that has a long-chain hydrocarbon group having 7-40 carbon atoms, and (b) a repeating unit formed from an acrylic monomer that has a hydrophilic group. A polyvinyl alcohol or glucose may be present as an additive.

19 Claims, No Drawings

OIL-RESISTANT AGENT AND OIL-RESISTANT COMPOSITION

CROSS-REFERENCE TO RELATED APPLICATIONS

This application is a Rule 53(b) Continuation of International Application No. PCT/JP2021/038108 filed Oct. 14, 2021, which claims priority from Japanese Patent Application Nos. 2020-174147 filed Oct. 15, 2020 and 2021-142572 filed Sep. 1, 2021, the respective disclosures of all of the above of which are incorporated herein by reference in their entirety.

TECHNICAL FIELD

The present disclosure relates to an oil-resistant agent and an oil-resistant composition.

BACKGROUND ART

Food packaging materials and food containers that are made of paper are required to prevent water and oil contained in food from oozing out. Accordingly, an oil-resistant agent is internally or externally applied to the paper.

Patent Literature 1 (JP 2004-238518 A) discloses producing starch-coated paper by applying a coating material containing 12.5 to 100% by weight of starch based on the total solid of the coating material onto a paper substrate.

CITATION LIST

Patent Literature

Patent Literature 1

JP 2004-238518 A

SUMMARY

The present disclosure relates to an oil-resistant composition comprising (1) a polysaccharide and (2) an oil-resistant polymer.

DESCRIPTION OF EMBODIMENT

The present disclosure provide an oil-resistant agent and an oil-resistant composition capable of imparting excellent oil-resistance to paper. The present disclosure relates to a paper oil-resistant agent containing a polysaccharide (preferably a combination of two or more polysaccharides). Moreover, the present disclosure relates to a treatment liquid that is a mixture of the paper oil-resistant agent and water and has a viscosity of 200 cps or lower. The viscosity is a viscosity at 50° C., and preferably 150 cps or lower, 100 cps or lower, or 80 cps or lower. The lower limit of the viscosity may be 1 cps. In addition, the present disclosure relates to an oil-resistant composition containing a polysaccharide and an oil-resistant polymer. The paper oil-resistant agent and the oil-resistant composition may each contain a liquid medium that is water and/or an organic solvent, preferably water or a mixture of water and an organic solvent (aqueous medium).

The present disclosure provides oil-resistant paper treated with the paper oil-resistant agent or the oil-resistant composition. The treatment of the paper is external or internal. The oil-resistant paper has an oil-resistant layer containing the paper oil-resistant agent or the oil-resistant composition by an external treatment method. Alternatively, the oil-resistant paper contains the paper oil-resistant agent or the oil-resistant composition in the inside of the paper by an internal treatment method.

The paper oil-resistant agent imparts high oil-resistance to paper.

The oil-resistant composition exhibits high oil-resistance even when the amount of the applied oil-resistant composition is small.

The paper oil-resistant agent contains (1) a polysaccharide.

The oil-resistant composition contains: (1) a polysaccharide, and (2) an oil-resistant polymer.

(1) Polysaccharide

The polysaccharide is a compound formed of a plurality of units (three or more units, e.g., 3 to 2000 units) of monosaccharide, such as glucose, galactose, and fructose, bonded together. The polysaccharide may be an oligosaccharide formed of 3 to 10 units of monosaccharide bonded together.

The polysaccharide may be an acidic polysaccharide, a neutral saccharide, and/or a basic saccharide.

The acidic polysaccharide is generally a polysaccharide having a carboxyl group (—COOH) or the like. Specific examples of the acidic polysaccharide include carrageenan, pectin, gum arabic, xanthan gum, gellan gum, agar, and gum tragacanth.

The neutral polysaccharide is an electrically neutral polysaccharide. Specific examples of the neutral polysaccharide include tamarind seed gum, guar gum, locust bean gum, starch, and pullulan.

The basic polysaccharide is a polysaccharide having an amino group (—$NH_2$) or the like. Specific examples of the basic polysaccharide include chitosan.

Specific examples of the polysaccharide include xanthan gum, karaya gum, welan gum, guar gum, pectin, tamarind gum, carrageenan, chitosan, gum arabic, locust bean gum, cellulose, alginic acid, starch, agar, dextran, and pullulan. The polysaccharide may be a substituted polysaccharide, and, in particular, a polysaccharide in which any of the hydroxyl groups is substituted.

The polysaccharide is preferably starch. The starch may be unmodified starch or modified starch. The starch is preferably modified starch subjected to at least one modification such as esterification modification, etherification modification, oxidation modification, alkaline modification, enzymatic modification, and bleaching modification. The starch may be pregelatinized starch. The term pregelatinized starch refers to starch in such a state that hydrogen bonds among sugar chains in the starch are broken to give free spaces among the sugar chains. Herein, pregelatinized starch falls within the category of modified starch.

Examples of the modified starch include acetylated adipate-crosslinked starch, acetylated oxidized starch, acetylated phosphate-crosslinked starch, alkenylsuccinated starch, starch acetate, oxidized starch, hydroxyalkylated starch (number of carbon atoms of alkyl group: 2 to 40 or 2 to 10, in particular, 2 or 3), hydroxyalkylated phosphate-crosslinked starch (number of carbon atoms of alkyl group: 2 to 40 or 2 to 10, in particular, 2 or 3), phosphate-crosslinked starch, phosphorylated starch, monophosphorylated phosphate-crosslinked starch, acid-modified starch, alkali-treated starch, enzymatically treated starch, bleached starch, and cationized starch (quaternary ammonium starch). Another example is dextrin obtained by decomposing starch into small molecules by a chemical or enzymatic method.

The starch is particularly preferably hydrophobized modified starch. The hydrophobized modified starch is starch modified (hydrophobized) to have a hydrophobic group (such as a hydrocarbon group having 1 to 40, 2 to 40, 3 to 30, or 4 to 20 carbon atoms). Examples of the hydrophobized modified starch include alkenylsuccinated starch, acetated starch, polyacrylonitrile-grafted starch, (meth) acrylic acid- or (meth)acrylate-grafted starch, and crosslinked starch. Examples of (meth)acrylate include methyl (meth)acrylate, ethyl (meth)acrylate, and butyl (meth)acrylate. A polyfunctional (divalent to pentavalent) agent is used for the crosslinked starch, and examples of the polyfunctional agent include phosphorus oxychloride and epichlorohydrin.

Examples of hydrophobization methods include a method of obtaining alkenylsuccinated starch by esterifying raw material starch with an alkenyl (e.g., number of carbon atoms of alkenyl group: 3 to 40, for example, 5 to 30 or 6 to 24) derivative of succinic acid (e.g., alkenylsuccinic anhydride such as octenylsuccinic anhydride and dodecenylsuccinic anhydride), a method of grafting a hydrophobic monomer (e.g., unsaturated nitrile such as acrylonitrile or alkyl (meth)acrylate (e.g., number of carbon atoms of alkyl group: 1 to 30)) onto raw material starch, a method of reacting raw material starch with organosilane, and a method of adding a hydrophobic group containing a hydrocarbon group (e.g., number of carbon atoms: 1 to 30) to starch through etherification or esterification. Examples of the raw material starch include natural starch such as rice starch, wheat starch, corn starch, potato starch, tapioca starch, and sweet potato starch.

Alkenylsuccinated starch (such as octenylsuccinated starch) is preferable. The number of carbon atoms of the alkenyl group in the alkenylsuccinated starch may be 3 to 40, for example, 5 to 30 or 6 to 24. Specific examples of the alkenylsuccinated starch include octenylsuccinated starch, decenylsuccinated starch, dodecenylsuccinated starch, tetradecenylsuccinated starch, hexadecenylsuccinated starch, and octadecenylsuccinated starch. Octenylsuccinated starch is preferable.

The degree of esterification of esterified starch is represented as the degree of substitution (moles of substituents, DS, per mole of anhydrous glucose residues), and DS may be 0.005 to 0.3 or 0.01 to 0.2.

While the hydrophobized modified starch has a hydrophobic group (such as a hydrocarbon group having 1 to 40, 2 to 40, or 3 to 30 carbon atoms), preferably, the hydrophobized modified starch also has hydrophilicity (such as a hydroxy group, an amino group, a carboxyl group, an oxyalkylene group (number of carbon atoms of alkylene: 1 to 3, in particular, 1 or 2)). The presence of the hydrophobic group and the hydrophilic group gives higher oil-resistance.

Specific examples of preferable starch include hydroxyalkylated starch (such as hydroxyethylated starch), oxidized starch, alkenylsuccinated starch (such as octenylsuccinated starch), dextrin (such as cyclodextrin), cationized starch, and pregelatinized starch.

The starch may be one starch, but is preferably a combination of two or more starches. The two or more starches are preferably (i) a combination of at least two hydrophobized modified starches (such as starches each modified to have a hydrocarbon group having 2 to 40 or 3 to 30 carbon atoms), or (ii) a combination of hydrophobized modified starch and other starch (starch other than the hydrophobized modified starch, in particular, modified starch other than the hydrophobized modified starch). Examples of other starch to be combined include, but are not limited to, etherified starch, oxidized starch, and dextrin.

A preferable combination of two or more starches is a combination including alkenylsuccinated starch, hydroxyalkylated starch, or oxidized starch. The two or more starches may be, for example, a combination of alkenylsuccinated starch and at least one starch selected from the group consisting of hydroxyalkylated starch, oxidized starch, dextrin, cationized starch, and pregelatinized starch.

Specific preferable examples of combinations of hydrophobized modified starch and other starch (starch other than hydrophobized modified starch) include a combination of alkenylsuccinated starch (such as octenylsuccinated starch) and hydroxyalkylated starch (such as hydroxyethylated starch).

In the combination of hydrophobized modified starch and other starch, the weight ratio of hydrophobized modified starch to other starch may be 10:90 to 99:1, 20:80 to 95:5, 30:70 to 90:10, or 40:60 to 85:15. In the combination only of hydrophobized modified starches, the weight ratio of alkenylsuccinated starch to other hydrophobized modified starch may be 10:90 to 99:1, 20:80 to 95:5, 30:70 to 90:10, or 40:60 to 85:15.

Generally, the oil-resistant agent further contains a liquid medium, specifically, water and/or an organic solvent, preferably an aqueous medium, i.e., water or a mixture of water and an organic solvent.

In addition to (1) the polysaccharide, the oil-resistant composition contains (2) an oil-resistant polymer.

(2) Oil-Resistance Polymer

The oil-resistant polymer (2) is generally a non-fluorine polymer.

The non-fluorine polymer is a compound having:

(a) a repeating unit formed from an acrylic monomer having a long-chain hydrocarbon group having 7 to 40 carbon atoms.

The non-fluorine polymer is preferably a non-fluorine copolymer having:

(a) a repeating unit formed from an acrylic monomer having a long-chain hydrocarbon group having 7 to 40 carbon atoms, and (b) a repeating unit formed from an acrylic monomer having a hydrophilic group.

Moreover, the non-fluorine copolymer preferably has a repeating unit formed of (c) a monomer having an ion donating group in addition to the monomers (a) and (b).

The non-fluorine copolymer may have (d) a repeating unit formed from another monomer in addition to the monomers (a), (b), and (c).

(a) Acrylic Monomer Having Long-Chain Hydrocarbon Group

The acrylic monomer having a long-chain hydrocarbon group (a) has a long-chain hydrocarbon group having 7 to 40 carbon atoms. The long-chain hydrocarbon group having 7 to 40 carbon atoms is preferably a linear or branched hydrocarbon group having 7 to 40 carbon atoms. The number of carbon atoms of the long-chain hydrocarbon group is preferably 10 to 40, such as 12 to 30, and in particular 15 to 30. Alternatively, the number of carbon atoms of the long-chain hydrocarbon group may be 18 to 40 carbon atoms.

The acrylic monomer having a long-chain hydrocarbon group (a) is preferably a monomer represented by formula:

$$CH_2{=}C({-}X^1){-}C({=}O){-}Y^1(R^1)_k$$

wherein $R^1$ is each independently a hydrocarbon group having 7 to 40 carbon atoms, $X^1$ is a hydrogen atom, a monovalent organic group, or a halogen atom, $Y^1$ is a divalent to tetravalent group composed of at least one selected from a hydrocarbon group having one carbon atom (in particular, $-CH_2-$, $-CH=$), $-C_6H_4-$, $-O-$, $-C(=O)-$, $-S(=O)_2-$, or $-NH-$, provided that a hydrocarbon group is excluded, and k is 1 to 3.

$X^1$ may be a hydrogen atom, a methyl group, halogen excluding a fluorine atom, a substituted or unsubstituted benzyl group, or a substituted or unsubstituted phenyl group. Examples of $X^1$ include a hydrogen atom, a methyl group, a chlorine atom, a bromine atom, an iodine atom, and a cyano group. $X^1$ is preferably a hydrogen atom, a methyl group, or a chlorine atom. $X^1$ is particularly preferably a hydrogen atom.

$Y^1$ is a divalent to tetravalent group. $Y^1$ is preferably a divalent group.

$Y^1$ is preferably a group composed of at least one selected from a hydrocarbon group having one carbon atom, $-C_6H_4-$, $-O-$, $-C(=O)-$, $-S(=O)_2-$, or $-NH-$, provided that a hydrocarbon group is excluded. Examples of the hydrocarbon group having one carbon atom include $-CH_2-$, $-CH=$ having a branched structure, and $-C\equiv$ having a branched structure.

$Y^1$ may be $-Y'-$, $-Y'-Y'-$, $-Y'-C(=O)-$, $-C(=O)-Y'-$, $-Y'-C(=O)-Y'-$, $-Y'-R'-$, $-Y'-R'-Y'-$, $-Y'-R'-Y'-C(=O)-$, $-Y'-R'-C(=O)-Y'-$, $-Y'-R'-Y'-C(=O)-Y'-$, or $-Y'-R'-Y'-R'-$ wherein Y' is a direct bond, $-O-$, $-NH-$, or $-S(=O)_2-$, and R' is $-(CH_2)_m-$ wherein m is an integer of 1 to 5, or $-C_6H_4-$ (a phenylene group).

Specific examples of $Y^1$ include $-O-$, $-NH-$, $-O-C(=O)-$, $-C(=O)-NH-$, $-NH-C(=O)-$, $-O-C(=O)-NH-$, $-NH-C(=O)-O-$, $-NH-C(=O)-NH-$, $-O-C_6H_4-$, $-O-(CH_2)_m-O-$, $-NH-(CH_2)_m-NH-$, $-O-(CH_2)_m-NH-$, $-NH-(CH_2)_mO-$, $-O-(CH_2)_mO-C(=O)-$, $-O-(CH_2)_m-C(=O)-O-$, $-NH-(CH_2)_m-O-C(=O)-$, $-NH-(CH_2)_m-C(=O)-O-$, $-O-(CH_2)_m-O-C(=O)-NH-$, $-O-(CH_2)_m-NH-C(=O)-O-$, $-O-(CH_2)_m-C(=O)-NH-$, $-O-(CH_2)_m-NH-C(=O)-$, $-O-(CH_2)_m-NH-C(=O)-NH-$, $-O-(CH_2)_m-O-C_6H_4-$, $-O-(CH_2)_m-NH-S(=O)_2-$, $-O-(CH_2)_m-S(=O)_2-NH-$, $-NH-(CH_2)_m-O-C(=O)-NH-$, $-NH-(CH_2)_m-NH-C(=O)-O-$, $-NH-(CH_2)_m-C(=O)-NH-$, $-NH-(CH_2)_m-NH-C(=O)-$, $-NH-(CH_2)_m-NH-C(=O)-NH-$, $-NH-(CH_2)_mO-C_6H_4-$, $-NH-(CH_2)_m-NH-C_6H_4-$, $-NH-(CH_2)_mNH-S(=O)_2-$, or $-NH-(CH_2)_mS(=O)_2-NH-$, wherein m is 1 to 5, and in particular 2 or 4.

$Y^1$ is preferably $-O-$, $-NH-$, $-O-(CH_2)_m-O-C(=O)-$, $-O-(CH_2)_mNH-C(=O)-$, $-O-(CH_2)_m-O-C(=O)-NH-$, $-O-(CH_2)_m-NH-C(=O)-O-$, $-O-(CH_2)_m-NH-C(=O)-NH-$, $-O-(CH_2)_m-NH-S(=O)_2-$, $-O-(CH_2)_m-S(=O)_2-NH-$, $-NH-(CH_2)_m-NH-S(=O)_2-$, or $-NH-(CH_2)_m-S(=O)_2-NH-$ wherein m is an integer of 1 to 5, and in particular 2 or 4. $Y^1$ is more preferably $-O-$ or $-O-(CH_2)_mNH-C(=O)-$, and in particular $-O-(CH_2)_m-NH-C(=O)-$.

$R^1$ is preferably a linear or branched hydrocarbon group. The hydrocarbon group may be in particular a linear hydrocarbon group. The hydrocarbon group is preferably an aliphatic hydrocarbon group, in particular a saturated aliphatic hydrocarbon group, and especially an alkyl group. The number of carbon atoms of the hydrocarbon group is preferably 12 to 30, such as 16 to 26 or 15 to 26, and in particular 18 to 22 or 17 to 22.

Examples of the acrylic monomer having a long-chain hydrocarbon group (a) include:

(a1) an acrylic monomer represented by formula:

$$CH_2=C(-X^2)-C(=O)-Y^2-R^2$$

wherein $R^2$ is a hydrocarbon group having 7 to 40 carbon atoms, $X^2$ is a hydrogen atom, a monovalent organic group, or a halogen atom, and $Y^2$ is $-O-$ or $-NH-$, and (a2) an acrylic monomer represented by formula:

$$CH_2=C(-X^3)-C(=O)-Y^3-Z(-Y^4-R^3)_n$$

wherein $R^3$ is each independently a hydrocarbon group having 7 to 40 carbon atoms, $X^3$ is a hydrogen atom, a monovalent organic group, or a halogen atom, $Y^3$ is $-O-$ or $-NH-$, $Y^4$ is each independently a group composed of at least one selected from a direct bond, or $-O-$, $-C(=O)-$, $-S(=O)_2-$, $-NH-$, or $-CH_2-$, Z is a divalent or trivalent hydrocarbon group having 1 to 5 carbon atoms, and n is 1 or 2.

(a1) Acrylic Monomer

The acrylic monomer (a1) is a compound represented by formula:

$$CH_2=C(-X^2)-C(=O)-Y^2-R^2$$

wherein $R^2$ is a hydrocarbon group having 7 to 40 carbon atoms, $X^2$ is a hydrogen atom, a monovalent organic group, or a halogen atom, and $Y^2$ is $-O-$ or $-NH-$.

The acrylic monomer (a1) is a long-chain acrylate ester monomer wherein $Y^2$ is $-O-$ or a long-chain acrylamide monomer wherein $Y^2$ is $-NH-$.

$R^2$ is preferably an aliphatic hydrocarbon group, in particular a saturated aliphatic hydrocarbon group, and especially an alkyl group. In $R^2$, the number of carbon atoms of the hydrocarbon group is preferably 12 to 30, such as 16 to 26, and in particular 18 to 22.

$X^2$ may be a hydrogen atom, a methyl group, halogen excluding a fluorine atom, a substituted or unsubstituted benzyl group, or a substituted or unsubstituted phenyl group, and is preferably a hydrogen atom, a methyl group, or a chlorine atom.

Preferable specific examples of the long-chain acrylate ester monomer include lauryl (meth)acrylate, stearyl (meth) acrylate, icosyl (meth)acrylate, behenyl (meth)acrylate, stearyl α-chloroacrylate, icosylα-chloroacrylate, and behenylα-chloroacrylate.

Preferable specific examples of the long-chain acrylamide monomer include stearyl (meth)acrylamide, icosyl (meth) acrylamide, and behenyl (meth)acrylamide.

(a2) Acrylic Monomer

The acrylic monomer (a2) is a monomer different from the acrylic monomer (a1). The acrylic monomer (a2) is (meth)

acrylate or (meth)acrylamide having a group composed of at least one selected from —O—, —C(=O)—, —S(=O)$_2$—, —NH—, or —$CH_2$—.

The acrylic monomer (a2) may be a compound represented by formula:

$$CH_2{=}C(—X^3)—C(=O)—Y^3—Z(—Y^4—R^3)_n$$

wherein

- $R^3$ is each independently a hydrocarbon group having 7 to 40 carbon atoms,
- $X^3$ is a hydrogen atom, a monovalent organic group, or a halogen atom,
- $Y^3$ is —O— or —NH—,
- $Y^4$ is each independently a group composed of at least one selected from a direct bond, or —O—, —C(=O)—, —S(=O)$_2$—, —NH—, or —$CH_2$—,
- Z is a direct bond or a divalent or trivalent hydrocarbon group having 1 to 5 carbon atoms, and
- n is 1 or 2.

$R^3$ is preferably an aliphatic hydrocarbon group, in particular a saturated aliphatic hydrocarbon group, and especially an alkyl group. In $R^3$, the number of carbon atoms of the hydrocarbon group is preferably 12 to 30, such as 16 to 26 or 15 to 26, and in particular 18 to 22 or 17 to 22.

$X^3$ may be a hydrogen atom, a methyl group, halogen excluding a fluorine atom, a substituted or unsubstituted benzyl group, or a substituted or unsubstituted phenyl group, and is preferably a hydrogen atom, a methyl group, or a chlorine atom.

$Y^4$ may be —Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'—, or —Y'—R'—Y'—R'— wherein

- Y' is each independently a direct bond, —O—, —NH—, or —S(=O)$_2$—, and
- R' is —$(CH_2)_m$— wherein m is an integer of 1 to 5, a linear hydrocarbon group having 1 to 5 carbon atoms and an unsaturated bond, a hydrocarbon group having 1 to 5 carbon atoms and a branched structure, or —$(CH_2)_l$—$C_6H_4$—$(CH_2)_l$— wherein l is each independently an integer of 0 to 5, and —$C_6H_4$— is a phenylene group.

Specific examples of $Y^4$ include a direct bond, —O—, —NH—, —O—C(=O)—, —C(=O)—O—, —C(=O)—NH—, —NH—C(=O)—, —NH—S(=O)$_2$—, —S(=O)$_2$—NH—, —O—C(=O)—NH—, —NH—C(=O)—O—, —NH—C(=O)—NH—, —O—$C_6H_4$—, —NH—$C_6H_4$—, —O—$(CH_2)_m$—O—, —NH—$(CH_2)_m$—NH—, —O—$(CH_2)_m$—NH—, —NH—$(CH_2)_m$O—, —O—$(CH_2)_m$O—C(=O)—, —O—$(CH_2)_m$—C(=O)—O—, —NH—$(CH_2)_m$—O—C(=O)—, —NH—$(CH_2)_m$—C(=O)—O—, —O—$(CH_2)_m$—O—C(=O)—NH—, —O—$(CH_2)_m$—NH—C(=O)—O—, —O—$(CH_2)_m$—C(=O)—NH—, —O—$(CH_2)_m$—NH—C(=O)—, —O—$(CH_2)_m$—NH—C(=O)—NH—, —O—$(CH_2)_m$—O—$C_6H_4$—, —NH—$(CH_2)_m$—O—C(=O)—NH—, —NH—$(CH_2)_m$—NH—C(=O)—O—, —NH—$(CH_2)_m$—C(=O)—NH—, —NH—$(CH_2)_m$—NH—C(=O)—, —NH—$(CH_2)_m$NH—C(=O)—NH—, —NH—$(CH_2)_m$—O—$C_6H_4$—, —NH—$(CH_2)_m$—NH—$C_6H_4$— wherein m is an integer of 1 to 5.

$Y^4$ is preferably —O—, —NH—, —O—C(=O)—, —C(=O)—O—, —C(=O)—NH—, —NH—C(=O)—, —NH—S(=O)$_2$—, —S(=O)$_2$—NH—, —O—C(=O)—NH—, —NH—C(=O)—O—, —NH—C(=O)—NH—, or —O—$C_6H_4$—. $Y^4$ is more preferably —NH—C(=O)—, —C(=O)—NH—, —O—C(=O)—NH—, —NH—C(=O)—O—, or —NH—C(=O)—NH—.

Z is a direct bond or a divalent or trivalent hydrocarbon group having 1 to 5 carbon atoms, and may have a linear structure or a branched structure. The number of carbon atoms of Z is preferably 2 to 4, and in particular 2. Specific examples of Z include a direct bond, —$CH_2$—, —$CH_2CH_2$—, —$CH_2CH_2CH_2$—, —$CH_2CH_2CH_2CH_2$—, —$CH_2CH_2CH_2CH_2CH_2$—, —$CH_2CH$= having a branched structure, —$CH_2$(CH—)$CH_2$— having a branched structure, —$CH_2CH_2CH$= having a branched structure, —$CH_2CH_2CH_2CH_2CH$= having a branched structure, —$CH_2CH_2$(CH—)$CH_2$— having a branched structure, and —$CH_2CH_2CH_2CH$= having a branched structure.

Z is preferably not a direct bond, and $Y^4$ and Z are simultaneously not direct bonds.

The acrylic monomer (a2) is preferably $CH_2$=C(—$X^3$)—C(=O)—O—$(CH_2)_m$—NH—C(=O)—$R^3$, $CH_2$=C(—$X^3$)—C(=O)—O—$(CH_2)_m$—O—C(=O)—NH—$R^3$, $CH_2$=C(—$X^3$)—C(=O)—O—$(CH_2)_m$—NH—C(=O)—O—$R^3$, or $CH_2$=C(—$X^3$)—C(=O)—O—$(CH_2)_m$NH—C(=O)—NH—$R^3$, wherein $R^3$ and $X^3$ are as defined above.

The acrylic monomer (a2) is particularly preferably $CH_2$=C(—$X^3$)—C(=O)—O—$(CH_2)_m$—NH—C(=O)—$R^3$.

The acrylic monomer (a2) can be produced by reacting hydroxyalkyl (meth)acrylate or hydroxyalkyl (meth)acrylamide with long-chain alkyl isocyanate. Examples of the long-chain alkyl isocyanate include lauryl isocyanate, myristyl isocyanate, cetyl isocyanate, stearyl isocyanate, oleyl isocyanate, and behenyl isocyanate.

Alternatively, the acrylic monomer (a2) can also be produced by reacting (meth)acrylate having an isocyanate group in a side chain, such as 2-methacryloyloxyethyl methacrylate, with long-chain alkylamine or long-chain alkyl alcohol. Examples of the long-chain alkylamine include laurylamine, myristylamine, cetylamine, stearylamine, oleylamine, and behenylamine. Examples of the long-chain alkyl alcohol include lauryl alcohol, myristyl alcohol, cetyl alcohol, stearyl alcohol, oleyl alcohol, and behenyl alcohol.

Preferable examples of the long-chain hydrocarbon group-containing acrylic monomer are as follows:

stearyl (meth)acrylate, behenyl (meth)acrylate, stearyl α-chloroacrylate, behenyl α-chloroacrylate;

stearyl (meth)acrylamide, behenyl (meth)acrylamide;

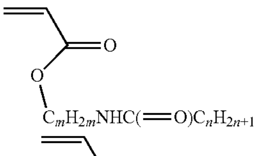

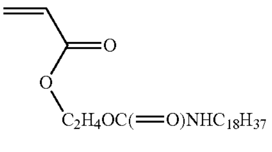

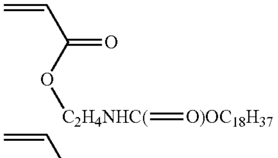

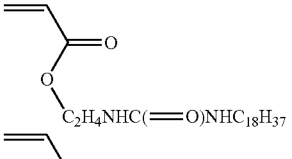

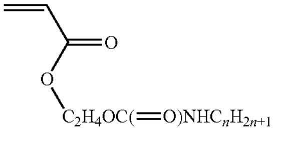

-continued

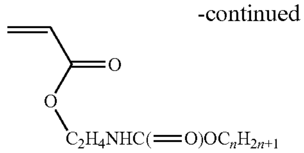

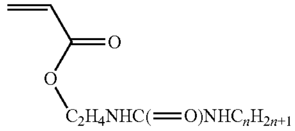

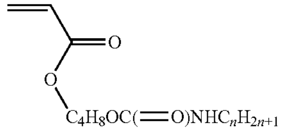

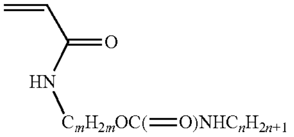

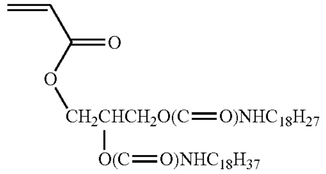

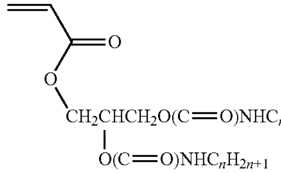

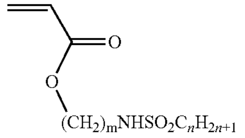

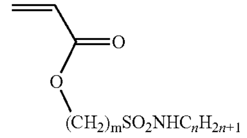

wherein n is a number of 7 to 40, and m is a number of 1 to 5.

The compounds of the above chemical formulae are acrylic compounds in which the α-position is a hydrogen atom, and specific examples may be methacrylic compounds in which the α-position is a methyl group and α-chloroacrylic compounds in which the α-position is a chlorine atom.

The melting point of the acrylic monomer having a long-chain hydrocarbon group (a) is preferably 10° C. or higher, and more preferably 25° C. or higher.

The acrylic monomer having a long-chain hydrocarbon group (a) is preferably an acrylate in which $X^1$, $X^2$, and $X^3$ are hydrogen atoms.

The acrylic monomer (a2) is preferably an amide group-containing monomer represented by formula:

$$R^{12}—C(=O)—NH—R^{13}—O—R^{11}$$

wherein $R^{11}$ is an organic residue having an ethylenically unsaturated polymerizable group, $R^{12}$ is a hydrocarbon group having 7 to 40 carbon atoms, and $R^{13}$ is a hydrocarbon group having 1 to 5 carbon atoms.

$R^{11}$ is an organic residue having an ethylenically unsaturated polymerizable group, and is not limited as long as there is a carbon-carbon double bond. Specific examples include organic residues having an ethylenically unsaturated polymerizable group such as $—C(=O)CR^{14}=CH_2$, $—CHR^{14}=CH_2$, and $—CH_2CHR^{14}=CH_2$, and $R^{14}$ is a hydrogen atom or an alkyl group having 1 to 4 carbon atoms. $R^{11}$ may have various organic groups other than the ethylenically unsaturated polymerizable group, e.g., organic groups such as chain hydrocarbons, cyclic hydrocarbons, polyoxyalkylene groups, and polysiloxane groups, and these organic groups may be substituted with various substituents. $R^{11}$ is preferably $—C(=O)CR^{14}=CH_2$.

$R^{12}$ is a hydrocarbon group having 7 to 40 carbon atoms and preferably an alkyl group, such as a chain hydrocarbon group or a cyclic hydrocarbon group. Among them, a chain hydrocarbon group is preferable, and a linear saturated hydrocarbon group is particularly preferable. The number of carbon atoms of $R^{12}$ is 7 to 40, preferably 11 to 27, and particularly preferably 15 to 23.

$R^{13}$ is a hydrocarbon group having 1 to 5 carbon atoms, and preferably an alkyl group. The hydrocarbon group having 1 to 5 carbon atoms may be either linear or branched, may have an unsaturated bond, and is preferably linear. The number of carbon atoms of $R^{13}$ is preferably 2 to 4, and particularly preferably 2. $R^{13}$ is preferably an alkylene group.

The amide group-containing monomer may be a monomer having one kind of $R^{12}$ (for example, a compound in which $R^{12}$ has 17 carbon atoms) or a monomer having a combination of multiple kinds of $R^{12}$ (for example, a mixture of a compound in which $R^{12}$ has 17 carbon atoms and a compound in which $R^{12}$ has 15 carbon atoms).

An example of the amide group-containing monomer is carboxylic acid amide alkyl (meth)acrylate.

Specific examples of the amide group-containing monomer include palmitic acid amide ethyl (meth)acrylate, stearic acid amide ethyl (meth)acrylate, behenic acid amide ethyl (meth)acrylate, myristic acid amide ethyl (meth)acrylate, lauric acid amide ethyl (meth)acrylate, isostearic acid ethylamide (meth)acrylate, oleic acid ethylamide (meth)acrylate, tert-butylcyclohexylcaproic acid amide ethyl (meth)acrylate, adamantanecarboxylic acid ethylamide (meth)acrylate, naphthalenecarboxylic acid amide ethyl (meth)acrylate, anthracenecarboxylic acid amide ethyl (meth)acrylate, palmitic acid amide propyl (meth)acrylate, stearic acid amide propyl (meth)acrylate, palmitic acid amide ethyl vinyl ether, stearic acid amide ethyl vinyl ether, palmitic acid amide ethyl allyl ether, stearic acid amide ethyl allyl ether, and mixtures thereof.

The amide group-containing monomer is preferably stearic acid amide ethyl (meth)acrylate. The amide group-containing monomer may be a mixture containing stearic acid amide ethyl (meth)acrylate. In a mixture containing stearic acid amide ethyl (meth)acrylate, the amount of stearic acid amide ethyl (meth)acrylate is, for example, 55 to 99% by weight, preferably 60 to 85% by weight, and more preferably 65 to 80% by weight based on the weight of the entirety of the amide group-containing monomer, and the remainder of the monomer may be, for example, palmitic acid amide ethyl (meth)acrylate.

(b) Acrylic Monomer Having Hydrophilic Group

The acrylic monomer having a hydrophilic group (b) is a monomer different from the monomer (a), and is a hydrophilic monomer. The hydrophilic group is preferably an oxyalkylene group (the number of carbon atoms of the alkylene group is 2 to 6). In particular, the acrylic monomer having a hydrophilic group (b) is preferably an oxyalkylene (meth)acrylate, for example, polyalkylene (or monoalkylene) glycol mono(meth)acrylate and/or polyalkylene (or monoalkylene) glycol di(meth)acrylate, polyalkylene (or monoalkylene) glycol mono(meth)acrylamide.

The acrylic monomer having a hydrophilic group (b) is preferably an oxyalkylene (meth)acrylate represented by formula:

$$CH_2{=}CX^{11}C({=}O){-}Y^{11}{-}(RO)_n\text{-}A$$

wherein $X^{11}$ is a hydrogen atom or a methyl group, $Y^{11}$ is —O— or —NH—,

R is an alkylene group having 2 to 6 carbon atoms,

A is a hydrogen atom, an unsaturated or saturated hydrocarbon group having 1 to 22 carbon atoms, or $CH_2{=}CX^{11}C({=}O){-}$, wherein $X^{11}$ is a hydrogen atom or a methyl group, and n is an integer of 1 to 90.

For example, the acrylic monomer having a hydrophilic group (b) is preferably an oxyalkylene (meth)acrylate represented by any of formulae:

$$CH_2{=}CX^{11}C({=}O){-}O{-}(RO)_n{-}X^{12} \quad (b1)$$

$$CH_2{=}CX^{11}C({=}O){-}O{-}(RO)_n{-}C({=}O)CX^{11}{=}CH_2 \quad (b2), \text{ and}$$

$$CH_2{=}CX^{11}C({=}O){-}NH{-}(RO)_n{-}X^{12} \quad (b3)$$

wherein $X^{11}$ is each independently a hydrogen atom or a methyl group, $X^{12}$ is each independently a hydrogen atom or an unsaturated or saturated hydrocarbon group having 1 to 22 carbon atoms, R is an alkylene group having 2 to 6 carbon atoms, and n is an integer of 1 to 90.

n may be, for example, 1 to 50, in particular 1 to 30, and especially 1 to 15 or 2 to 15. Alternatively, n may be, for example, 1.

R may be a linear or branched alkylene group such as a group represented by formula $-(CH_2)_x-$ or $-(CH_2)_{x1}-(CH(CH_3))_{x2}-$ wherein x1 and x2 are 0 to 6 such as 2 to 5, and the sum of x1 and x2 is 1 to 6; and the order of $-(CH_2)_{x1}-$ and $-(CH(CH_3))_{x2}-$ is not limited to the formula shown, and may be random.

In $-(RO)_n-$, there may be two or more kinds (such as 2 to 4 kinds, and in particular 2 kinds) of R, and thus $-(RO)_n-$ may be a combination of, for example, $-(R^1O)_{n1}-$ and $-(R^2O)_{n2}-$ wherein $R^1$ and $R^2$ are mutually different and an alkylene group having 2 to 6 carbon atoms, n1 and n2 are a number of 1 or more, and the sum of n1 and n2 is 2 to 90.

R in formulae (b1), (b2), and (b3) is particularly preferably an ethylene group, a propylene group, or a butylene group. R in formulae (b1), (b2), and (b3) may be a combination of two or more kinds of alkylene groups. In this case, at least one R is preferably an ethylene group, a propylene group, or a butylene group. Examples of the combination of R include a combination of an ethylene group/a propylene group, a combination of an ethylene group/a butylene group, and a combination of a propylene group/a butylene group. The monomer (b) may be a mixture of two or more kinds. In this case, in at least one monomer (b), R in formula (b1), (b2), or (b3) is preferably an ethylene group, a propylene group, or a butylene group. Polyalkylene glycol di(meth)acrylate represented by formula (b2) is not preferably used solely as the monomer (b), and is preferably used in combination with the monomer (b1). In this case as well, the compound represented by formula (b2) is preferably less than 30% by weight in the monomer (b) used.

Specific examples of the acrylic monomer having a hydrophilic group (b) include, but are not limited to, the following.

$CH_2{=}CHCOO{-}CH_2CH_2O{-}H$
$CH_2{=}CHCOO{-}CH_2CH_2CH_2O{-}H$
$CH_2{=}CHCOO{-}CH_2CH(CH_3)O{-}H$
$CH_2{=}CHCOO{-}CH(CH_3)CH_2O{-}H$
$CH_2{=}CHCOO{-}CH_2CH_2CH_2CH_2O{-}H$
$CH_2{=}CHCOO{-}CH_2CH_2CH(CH_3)O{-}H$
$CH_2{=}CHCOO{-}CH_2CH(CH_3)CH_2O{-}H$
$CH_2{=}CHCOO{-}CH(CH_3)CH_2CH_2O{-}H$
$CH_2{=}CHCOO{-}CH_2CH(CH_2CH_3)O{-}H$
$CH_2{=}CHCOO{-}CH_2C(CH_3)_2O{-}H$
$CH_2{=}CHCOO{-}CH(CH_2CH_3)CH_2O{-}H$
$CH_2{=}CHCOO{-}C(CH_3)_2CH_2O{-}H$
$CH_2{=}CHCOO{-}CH(CH_3)CH(CH_3)O{-}H$
$CH_2{=}CHCOO{-}C(CH_3)(CH_2CH_3)O{-}H$
$CH_2{=}CHCOO{-}(CH_2CH_2O)_2{-}H$
$CH_2{=}CHCOO{-}(CH_2CH_2O)_4{-}H$
$CH_2{=}CHCOO{-}(CH_2CH_2O)_5{-}H$
$CH_2{=}CHCOO{-}(CH_2CH_2O)_6{-}H$
$CH_2{=}CHCOO{-}(CH_2CH_2O)_5{-}CH_3$
$CH_2{=}CHCOO{-}(CH_2CH_2O)_9{-}CH_3$
$CH_2{=}CHCOO{-}(CH_2CH_2O)_{23}{-}CH_3$
$CH_2{=}CHCOO{-}(CH_2CH_2O)_{90}{-}CH_3$
$CH_2{=}CHCOO{-}(CH_2CH(CH_3)O)_9{-}H$
$CH_2{=}CHCOO{-}(CH_2CH(CH_3)O)_9{-}CH_3$
$CH_2{=}CHCOO{-}(CH_2CH(CH_3)O)_{12}{-}CH_3$
$CH_2{=}CHCOO{-}(CH_2CH_2O)_5{-}(CH_2CH(CH_3)O)_2{-}H$
$CH_2{=}CHCOO{-}(CH_2CH_2O)_5{-}(CH_2CH(CH_3)O)_3{-}CH_3$
$CH_2{=}CHCOO{-}(CH_2CH_2O)_8{-}(CH_2CH(CH_3)O)_6{-}CH_2CH(C_2H_5)\ C_4H_9$
$CH_2{=}CHCOO{-}(CH_2CH_2O)_{23}{-}OOC(CH_3)C{=}CH_2$
$CH_2{=}CHCOO{-}(CH_2CH_2O)_2O{-}(CH_2CH(CH_3)O)_5{-}CH_2{-}CH{=}CH_2$
$CH_2{=}CHCOO{-}(CH_2CH_2O)_9{-}H$
$CH_2{=}C(CH_3)COO{-}CH_2CH_2O{-}H$
$CH_2{=}C(CH_3)COO{-}CH_2CH_2CH_2O{-}H$
$CH_2{=}C(CH_3)COO{-}CH_2CH(CH_3)O{-}H$
$CH_2{=}C(CH_3)COO{-}CH(CH_3)CH_2O{-}H$
$CH_2{=}C(CH_3)COO{-}CH_2CH_2CH_2CH_2O{-}H$
$CH_2{=}C(CH_3)COO{-}CH_2CH_2CH(CH_3)O{-}H$
$CH_2{=}C(CH_3)COO{-}CH_2CH(CH_3)CH_2O{-}H$
$CH_2{=}C(CH_3)COO{-}CH(CH_3)CH_2CH_2O{-}H$
$CH_2{=}C(CH_3)COO{-}CH_2CH(CH_2CH_3)O{-}H$
$CH_2{=}C(CH_3)COO{-}CH_2C(CH_3)_2O{-}H$
$CH_2{=}C(CH_3)COO{-}CH(CH_2CH_3)CH_2O{-}H$
$CH_2{=}C(CH_3)COO{-}C(CH_3)_2CH_2O{-}H$
$CH_2{=}C(CH_3)COO{-}CH(CH_3)_2CH(CH_3)O{-}H$
$CH_2{=}C(CH_3)COO{-}C(CH_3)(CH_2CH_3)O{-}H$
$CH_2{=}C(CH_3)COO{-}(CH_2CH_2O)_2{-}H$
$CH_2{=}C(CH_3)COO{-}(CH_2CH_2O)_4{-}H$
$CH_2{=}C(CH_3)COO{-}(CH_2CH_2O)_5{-}H$
$CH_2{=}C(CH_3)COO{-}(CH_2CH_2O)_6{-}H$
$CH_2{=}C(CH_3)COO{-}(CH_2CH_2O)_9{-}H$
$CH_2{=}C(CH_3)COO{-}(CH_2CH_2O)_5{-}CH_3$
$CH_2{=}C(CH_3)COO{-}(CH_2CH_2O)_9{-}CH_3$
$CH_2{=}C(CH_3)COO{-}(CH_2CH_2O)_{23}{-}CH_3$
$CH_2{=}C(CH_3)COO{-}(CH_2CH_2O)_{90}{-}CH_3$
$CH_2{=}C(CH_3)COO{-}(CH_2CH(CH_3)O)_9{-}H$
$CH_2{=}C(CH_3)COO{-}(CH_2CH(CH_3)O)_9{-}CH_3$
$CH_2{=}C(CH_3)COO{-}(CH_2CH(CH_3)O)_{12}{-}CH_3$
$CH_2{=}C(CH_3)COO{-}(CH_2CH_2O)_5{-}(CH_2CH(CH_3)O)_2{-}H$ $CH_2{=}C(CH_3)COO{-}(CH_2CH_2O)_5{-}(CH_2CH(CH_3)O)_3{-}CH_3$ $CH_2{=}C(CH_3)COO{-}(CH_2CH_2O)_8{-}(CH_2CH(CH_3)O)_6{-}CH_2CH(C_2H_5)\ C_4H_9$ $CH_2{=}C(CH_3)COO{-}(CH_2CH_2O)_{23}{-}OOC(CH_3)C{=}CH_2$ $CH_2{=}C(CH_3)COO{-}(CH_2CH_2O)_2O{-}(CH_2CH(CH_3)O)_5{-}CH_2{-}CH{=}CH_2$ $CH_2{=}CH{-}C({=}O){-}NH{-}CH_2CH_2O{-}H$ $CH_2{=}CH{-}C({=}O){-}NH{-}CH_2CH_2CH_2O{-}H$ $CH_2{=}CH{-}C({=}O){-}NH{-}CH_2CH(CH_3)O{-}H$ $CH_2{=}CH{-}C({=}O){-}NH{-}CH(CH_3)CH_2O{-}H$ $CH_2{=}CH{-}C({=}O){-}NH{-}CH_2CH_2CH_2CH_2O{-}H$ $CH_2{=}CH{-}C({=}O){-}NH{-}CH_2CH_2CH(CH_3)O{-}H$ $CH_2{=}CH{-}C({=}O){-}NH{-}CH_2CH(CH_3)CH_2O{-}H$ $CH_2{=}CH{-}C({=}O){-}NH{-}CH(CH_3)CH_2CH_2O{-}H$ $CH_2{=}CH{-}C({=}O){-}NH{-}CH_2CH(CH_2CH_3)O{-}H$ $CH_2{=}CH{-}C({=}O){-}NH{-}CH_2C(CH_3)_2O{-}H$ $CH_2{=}CH{-}C({=}O){-}NH{-}CH(CH_2CH_3)CH_2O{-}H$ $CH_2{=}CH{-}C({=}O){-}NH{-}C(CH_3)_2CH_2O{-}H$ $CH_2{=}CH{-}C({=}O){-}NH{-}CH(CH_3)CH(CH_3)O{-}H$ $CH_2{=}CH{-}C({=}O){-}NH{-}C(CH_3)(CH_2CH_3)O{-}H$ $CH_2{=}CH{-}C({=}O){-}NH{-}(CH_2CH_2O)_2{-}H$ $CH_2{=}CH{-}C({=}O){-}NH{-}(CH_2CH_2O)_4{-}H$ $CH_2{=}CH{-}C({=}O){-}NH{-}(CH_2CH_2O)_5{-}H$ $CH_2{=}CH{-}C({=}O){-}NH{-}(CH_2CH_2O)_6{-}H$ $CH_2{=}CH{-}C({=}O){-}NH{-}(CH_2CH_2O)_9{-}H$ $CH_2{=}CH{-}C({=}O){-}NH{-}(CH_2CH_2O)_5{-}CH_3$ $CH_2{=}CH{-}C({=}O){-}NH{-}(CH_2CH_2O)_9{-}CH_3$ $CH_2{=}CH{-}C({=}O){-}NH{-}(CH_2CH_2O)_{23}{-}CH_3$ $CH_2{=}CH{-}C({=}O){-}NH{-}(CH_2CH_2O)_{90}{-}CH_3$ $CH_2{=}CH{-}C({=}O){-}NH{-}(CH_2CH(CH_3)O)_9{-}H$ $CH_2{=}CH{-}C({=}O){-}NH{-}(CH_2CH(CH_3)O)_9{-}CH_3$ $CH_2{=}CH{-}C({=}O){-}NH{-}(CH_2CH(CH_3)O)_{12}{-}CH_3$ $CH_2{=}CH{-}C({=}O){-}NH{-}(CH_2CH_2O)_5{-}(CH_2CH(CH_3)O)_2{-}H$ $CH_2{=}CH{-}C({=}O){-}NH{-}(CH_2CH_2O)_5{-}(CH_2CH(CH_3)O)_3{-}CH_3$ $CH_2{=}CH{-}C({=}O){-}NH{-}(CH_2CH_2O)_8{-}(CH_2CH(CH_3)O)_6{-}CH_2CH(C_2H_5)\ C_4H_9$ $CH_2{=}C(CH_3){-}C({=}O){-}NH{-}CH_2CH_2O{-}H$ $CH_2{=}C(CH_3){-}C({=}O){-}NH{-}CH_2CH_2CH_2O{-}H$ $CH_2{=}C(CH_3){-}C({=}O){-}NH{-}CH_2CH(CH_3)O{-}H$ $CH_2{=}C(CH_3){-}C({=}O){-}NH{-}CH(CH_3)CH_2O{-}H$ $CH_2{=}C(CH_3){-}C({=}O){-}NH{-}CH_2CH_2CH_2CH_2O{-}H$ $CH_2{=}C(CH_3){-}C({=}O){-}NH{-}CH_2CH_2CH(CH_3)O{-}H$ $CH_2{=}C(CH_3){-}C({=}O){-}NH{-}CH_2CH(CH_3)CH_2O{-}H$ $CH_2{=}C(CH_3){-}C({=}O){-}NH{-}CH(CH_3)CH_2CH_2O{-}H$ $CH_2{=}C(CH_3){-}C({=}O){-}NH{-}CH_2CH(CH_2CH_3)O{-}H$ $CH_2{=}C(CH_3){-}C({=}O){-}NH{-}CH_2C(CH_3)_2O{-}H$ $CH_2{=}C(CH_3){-}C({=}O){-}NH{-}CH(CH_2CH_3)CH_2O{-}H$ $CH_2{=}C(CH_3){-}C({=}O){-}NH{-}C(CH_3)_2CH_2O{-}H$ $CH_2{=}C(CH_3){-}C({=}O){-}NH{-}CH(CH_3)CH(CH_3)O{-}H$ $CH_2{=}C(CH_3){-}C({=}O){-}NH{-}C(CH_3)(CH_2CH_3)O{-}H$ $CH_2{=}C(CH_3){-}C({=}O){-}NH{-}(CH_2CH_2O)_2{-}H$ $CH_2{=}C(CH_3){-}C({=}O){-}NH{-}(CH_2CH_2O)_4{-}H$ $CH_2{=}C(CH_3){-}C({=}O){-}NH{-}(CH_2CH_2O)_5{-}H$ $CH_2{=}C(CH_3){-}C({=}O){-}NH{-}(CH_2CH_2O)_6{-}H$ $CH_2{=}C(CH_3){-}C({=}O){-}NH{-}(CH_2CH_2O)_9{-}H$ $CH_2{=}C(CH_3){-}C({=}O){-}NH{-}(CH_2CH_2O)_5{-}CH_3$ $CH_2{=}C(CH_3){-}C({=}O){-}NH{-}(CH_2CH_2O)_9{-}CH_3$ $CH_2{=}C(CH_3){-}C({=}O){-}NH{-}(CH_2CH_2O)_{23}{-}CH_3$ $CH_2{=}C(CH_3){-}C({=}O){-}NH{-}(CH_2CH_2O)_{90}{-}CH_3$ $CH_2{=}C(CH_3){-}C({=}O){-}NH{-}(CH_2CH(CH_3)O)_9{-}H$ $CH_2{=}C(CH_3){-}C({=}O){-}NH{-}(CH_2CH(CH_3)O)_9{-}CH_3$ $CH_2{=}C(CH_3){-}C({=}O){-}NH{-}(CH_2CH(CH_3)O)_{12}{-}CH_3$ $CH_2{=}C(CH_3){-}C({=}O){-}NH{-}(CH_2CH_2O)_5{-}(CH_2CH(CH_3)O)_2{-}H$ $CH_2{=}C(CH_3){-}C({=}O){-}NH{-}(CH_2CH_2O)_5{-}(CH_2CH(CH_3)O)_3{-}CH_3$ $CH_2{=}C(CH_3){-}C({=}O){-}NH{-}(CH_2CH_2O){-}(CH_2CH(CH_3)O)_6{-}CH_2CH(C_2H_5)\ C_4H_9$

The monomer (b) is preferably acrylate or acrylamide in which $X^{11}$ is a hydrogen atom. In particular, hydroxyethyl acrylate, hydroxypropyl acrylate, hydroxybutyl acrylate, or hydroxyethyl acrylamide is preferable.

(C) Monomer Having Ion Donating Group

The monomer having an ion donating group (c) is a monomer different from the monomer (a) and the monomer (b). The monomer (c) is preferably a monomer having an olefinic carbon-carbon double bond and an ion donating group. The ion donating group is an anion donating group and/or a cation donating group.

Examples of the monomer having an anion donating group include monomers having a carboxyl group, a sulfonic acid group, or a phosphoric acid group. Specific examples of the monomer having an anion donating group include (meth)acrylic acid, crotonic acid, maleic acid, fumaric acid, itaconic acid, citraconic acid, vinyl sulfonic acid, (meth)allylsulfonic acid, styrenesulfonic acid, phosphoric acid (meth)acrylate, vinylbenzenesulfonic acid, acrylamide tert-butyl sulfonic acid, and salts thereof.

Examples of salts of the anion donating group include alkali metal salts, alkaline earth metal salts, and ammonium salts, such as a methyl ammonium salt, an ethanol ammonium salt, and a triethanol ammonium salt.

In the monomer having a cation donating group, examples of the cation donating group include an amino group and preferably a tertiary amino group and a quaternary amino group. In the tertiary amino group, two groups bonded to the nitrogen atom are the same or different and are preferably an aliphatic group having 1 to 5 carbon atoms (in particular an alkyl group), an aromatic group having 6 to 20 carbon atoms (an aryl group), or an araliphatic group having 7 to 25 carbon atoms (in particular an aralkyl group such as a benzyl group ($C_6H_5{-}CH_2{-}$)). In the quaternary amino group, three groups bonded to the nitrogen atom are the same or different and are preferably an aliphatic group having 1 to 5 carbon atoms (in particular an alkyl group), an aromatic group having 6 to 20 carbon atoms (an aryl group), or an araliphatic group having 7 to 25 carbon atoms (in particular an aralkyl group such as a benzyl group ($C_6H_5{-}CH_2{-}$)). In the tertiary and quaternary amino groups, the remaining one group bonded to the nitrogen atom may have a carbon-carbon double bond. The cation donating group may be in the form of a salt.

A cation donating group that is a salt is a salt formed with an acid (an organic acid or an inorganic acid). Organic acids such as carboxylic acids having 1 to 20 carbon atoms (in particular, monocarboxylic acids such as acetic acid, propionic acid, butyric acid, and stearic acid) are preferable. Dimethylaminoethyl (meth)acrylate, diethylaminoethyl (meth)acrylate, and salts thereof are preferable.

Specific examples of the monomer having a cation donating group are as follows.

$CH_2$═CHCOO—$CH_2CH_2$—$N(CH_3)_2$ and salts thereof (such as acetate)
$CH_2$═CHCOO—$CH_2CH_2$—$N(CH_2CH_3)_2$ and salts thereof (such as acetate)
$CH_2$═$C(CH_3)$COO—$CH_2CH_2$—$N(CH_3)_2$ and salts thereof (such as acetate)
$CH_2$═$C(CH_3)$COO—$CH_2CH_2$—$N(CH_2CH_3)_2$ and salts thereof (such as acetate)
$CH_2$═CHC(O)N(H)—$CH_2CH_2CH_2$—$N(CH_3)_2$ and salts thereof (such as acetate)
$CH_2$═CHCOO—$CH_2CH_2$—N(—$CH_3$) (—$CH_2$—$C_6H_5$) and salts thereof (such as acetate)
$CH_2$═$C(CH_3)$COO—$CH_2CH_2$—N(—$CH_2CH_3$) (—$CH_2$—$C_6H_5$) and salts thereof (such as acetate)
$CH_2$═CHCOO—$CH_2CH_2$—$N^+(CH_3)_3Cl^-$
$CH_2$═CHCOO—$CH_2CH_2$—$N^+$(—$CH_3)_2$ (—$CH_2$—$C_6H_5$) $Cl^-$
$CH_2$═$C(CH_3)$COO—$CH_2CH_2$—$N^+(CH_3)_3Cl^-$
$CH_2$═CHCOO—$CH_2$CH(OH) $CH_2$—$N^+(CH_3)_3Cl^-$
$CH_2$═$C(CH_3)$COO—$CH_2$CH(OH) $CH_2$—$N^+(CH_3)_3Cl^-$
$CH_2$═$C(CH_3)$COO—$CH_2$CH(OH) $CH_2$—$N^+$(—$CH_2CH_3)_2$ (—$CH_2$—$C_6H_5$) $Cl^-$
$CH_2$═$C(CH_3)$COO—$CH_2CH_2$—$N^+(CH_3)_3Br^-$
$CH_2$═$C(CH_3)$COO—$CH_2CH_2$—$N^+(CH_3)_3I^-$
$CH_2$═$C(CH_3)$COO—$CH_2CH_2$—$N^+(CH_3)_3$O—$SO_3CH_3$
$CH_2$═$C(CH_3)$COO—$CH_2CH_2$—$N^+(CH_3)$ (—$CH_2$—$C_6H_5)_2Br^-$ The monomer having an ion donating group (c) is preferably methacrylic acid, acrylic acid, and dimethylaminoethyl methacrylate, and more preferably methacrylic acid and dimethylaminoethyl methacrylate.

(d) Another Monomer

Another monomer (d) is a monomer different from the monomers (a), (b), and (c). Examples of such another monomer include ethylene, vinyl acetate, vinyl chloride, vinyl fluoride, halogenated vinyl styrene, α-methylstyrene, p-methylstyrene, polyoxyalkylene mono(meth)acrylate, (meth)acrylamide, diacetone (meth)acrylamide, methylolated (meth)acrylamide, N-methylol (meth)acrylamide, alkyl vinyl ether, halogenated alkyl vinyl ether, alkyl vinyl ketone, butadiene, isoprene, chloroprene, glycidyl (meth) acrylate, aziridinyl (meth)acrylate, benzyl (meth)acrylate, isocyanate ethyl (meth)acrylate, cyclohexyl (meth)acrylate, isobornyl (meth)acrylate, short-chain alkyl (meth)acrylate, maleic anhydride, (meth)acrylate having a polydimethylsiloxane group, and N-vinylcarbazole.

The amount of the repeating unit formed from the monomer (a) (repeating unit (a)) may be 30 to 95% by weight or 30 to 90% by weight, preferably 40 to 88% by weight (or 45 to 95% by weight), and more preferably 50 to 85% by weight, based on the non-fluorine copolymer (or based on the total of the repeating unit (a) and the repeating unit (b)).

The amount of the repeating unit formed from the monomer (b) (repeating unit (b)) may be 5 to 70% by weight or 10 to 70% by weight, preferably 8 to 50% by weight, and more preferably 10 to 40% by weight, based on the non-fluorine copolymer (or based on the total of the repeating unit (a) and the repeating unit (b)).

The amount of the repeating unit formed from the monomer (c) may be 0.1 to 30% by weight, preferably 0.5 to 20% by weight, and more preferably 1 to 15% by weight based on the non-fluorine copolymer.

The amount of the repeating unit formed from the monomer (d) may be 0 to 20% by weight, such as 1 to 15% by weight, and in particular 2 to 10% by weight based on the non-fluorine copolymer.

The weight average molecular weight of the non-fluorine copolymer may be 1,000 to 1,000,000 or 10,000,000, preferably 5,000 to 800,000 or 8,000,000, and more preferably 10,000 to 400,000 or 4,000,000. The weight average molecular weight is a value obtained in terms of polystyrene by gel permeation chromatography.

Herein, "(meth)acryl" means acryl or methacryl. For example, "(meth)acrylate" means acrylate or methacrylate.

From the viewpoint of oil-resistance, the non-fluorine copolymer is preferably a random copolymer rather than a block copolymer.

The melting point or the glass transition point of the non-fluorine copolymer is preferably 20° C. or higher, more preferably 30° C. or higher, and particularly preferably 35° C. or higher such as 40° C. or higher.

Polymerization for the non-fluorine copolymer is not limited, and various polymerization methods can be selected, such as bulk polymerization, solution polymerization, emulsion polymerization, and radiation polymerization. For example, in general, solution polymerization involving an organic solvent, and emulsion polymerization involving water or involving an organic solvent and water in combination, are selected. The non-fluorine copolymer after polymerization is diluted with water to be emulsified in water and thus formed into a treatment liquid.

Herein, it is preferable that after polymerization (for example, solution polymerization or emulsion polymerization, preferably solution polymerization), water is added, and then the solvent is removed to disperse the polymer in water. An emulsifier does not need to be added, and a self-dispersive product can be produced.

Examples of organic solvents include ketones such as acetone and methyl ethyl ketone, esters such as ethyl acetate and methyl acetate, glycols such as propylene glycol, dipropylene glycol monomethyl ether, N-methyl-2-pyrrolidone (NMP), dipropylene glycol, tripropylene glycol, and low molecular weight polyethylene glycol, and alcohols such as ethyl alcohol and isopropanol.

For example, peroxide, an azo compound, or a persulfate compound can be used as a polymerization initiator. The polymerization initiator is, in general, water-soluble and/or oil-soluble.

Specific examples of the oil-soluble polymerization initiator preferably include 2,2'-azobis(2-methylpropionitrile), 2,2'-azobis(2-methylbutyronitrile), 2,2'-azobis(2,4-dimethylvaleronitrile), 2,2'-azobis(2,4-dimethyl-4-methoxyvaleronitrile), 1,1'-azobis(cyclohexan-1-carbonitrile), dimethyl 2,2'-azobis(2-methylpropionate), 2,2'-azobis(2-isobutyronitrile), benzoyl peroxide, di-tert-butyl peroxide, lauryl peroxide, cumene hydroperoxide, t-butyl peroxypivalate, diisopropyl peroxydicarbonate, and t-butyl perpivalate.

Specific examples of the water-soluble polymerization initiator preferably include 2,2'-azobisisobutylamidine dihydrochloride, 2,2'-azobis(2-methylpropionamidine) hydrochloride, 2,2'-azobis[2-(2-imidazolin-2-yl)propane] hydrochloride, 2,2'-azobis[2-(2-imidazolin-2-yl)propane] sulfate hydrate, 2,2'-azobis[2-(5-methyl-2-imidazolin-2-yl)propane] hydrochloride, potassium persulfate, barium persulfate, ammonium persulfate, and hydrogen peroxide.

The polymerization initiator is used in the range of 0.01 to 5 parts by weight based on 100 parts by weight of the monomers.

In order to regulate the molecular weight, a chain transfer agent such as a mercapto group-containing compound may be used, and specific examples thereof include 2-mercaptoethanol, thiopropionic acid, and alkyl mercaptan. The mercapto group-containing compound is used in the range of 10 parts by weight or less, or 0.01 to 5 parts by weight, based on 100 parts by weight of the monomers.

Specifically, the non-fluorine copolymer can be produced as follows.

In solution polymerization, a method is employed that involves dissolving the monomers in an organic solvent, performing nitrogen purge, then adding a polymerization initiator, and heating and stirring the mixture, for example, in the range of 40 to 120° C. for 1 to 10 hours. The polymerization initiator may be, in general, an oil-soluble polymerization initiator.

The organic solvent is inert to and dissolves the monomers, and examples include ketones such as acetone and methyl ethyl ketone, esters such as ethyl acetate and methyl acetate, glycols such as propylene glycol, dipropylene glycol monomethyl ether, N-methyl-2-pyrrolidone (NMP), dipropylene glycol, tripropylene glycol, and low molecular weight polyethylene glycol, alcohols such as ethyl alcohol and isopropanol, and hydrocarbon solvents such as n-heptane, n-hexane, n-octane, cyclohexane, methylcyclohexane, cyclopentane, methylcyclopentane, methylpentane, 2-ethylpentane, isoparaffin hydrocarbon, liquid paraffin, decane, undecane, dodecane, mineral spirit, mineral turpen, and naphtha. Preferable examples of the solvent include acetone, chloroform, HCHC 225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane, trichlorotrifluoroethane, N-methyl-2-pyrrolidone (NMP), and dipropylene glycol monomethyl ether (DPM). The organic solvent is used in the range of 50 to 2,000 parts by weight, such as 50 to 1,000 parts by weight, based on total 100 parts by weight of the monomers.

In emulsion polymerization, a method is employed that involves emulsifying the monomers in water in the presence of an emulsifier, performing nitrogen purge, then adding a polymerization initiator, and stirring the mixture in the range of 40 to 80° C. for 1 to 10 hours for polymerization. The polymerization initiator may be a water-soluble polymerization initiator such as 2,2'-azobisisobutylamidine dihydrochloride, 2,2'-azobis(2-methylpropionamidine) hydrochloride, 2,2'-azobis[2-(2-imidazolin-2-yl)propane] hydrochloride, 2,2'-azobis[2-(2-imidazolin-2-yl)propane] sulfate hydrate, 2,2'-azobis[2-(5-methyl-2-imidazolin-2-yl) propane] hydrochloride, potassium persulfate, barium persulfate, ammonium persulfate, or hydrogen peroxide; or an oil-soluble polymerization initiator such as 2,2'-azobis(2-methylpropionitrile), 2,2'-azobis(2-methylbutyronitrile), 2,2'-azobis(2,4-dimethylvaleronitrile), 2,2'-azobis(2,4-dimethyl-4-methoxyvaleronitrile), 1,1'-azobis(cyclohexan-1-carbonitrile), dimethyl 2,2'-azobis(2-methylpropionate), 2,2'-azobis(2-isobutyronitrile), benzoyl peroxide, di-tert-butyl peroxide, lauryl peroxide, cumene hydroperoxide, t-butyl peroxypivalate, diisopropyl peroxydicarbonate, or t-butyl perpivalate. The polymerization initiator is used in the range of 0.01 to 10 parts by weight based on 100 parts by weight of the monomers.

In order to obtain a water dispersion of the polymer, that has excellent stability when being left to stand, it is desirable that the monomers are formed into fine particles in water by using an emulsifying apparatus capable of applying strong crushing energy such as a high-pressure homogenizer or an ultrasonic homogenizer, and polymerized by using an oil-soluble polymerization initiator. Various anionic, cationic, or nonionic emulsifiers can be used as emulsifiers, and are used in the range of 0.5 to 20 parts by weight based on 100 parts by weight of the monomers. An anionic and/or nonionic and/or cationic emulsifier is preferably used. When the monomers are not completely compatible, a compatibilizer such as a water-soluble organic solvent or a low molecular weight monomer that causes the monomers to be sufficiently compatible is preferably added. By adding a compatibilizer, emulsifiability and copolymerizability can be increased.

Examples of the water-soluble organic solvent include acetone, propylene glycol, dipropylene glycol monomethyl ether (DPM), dipropylene glycol, tripropylene glycol, ethanol, N-methyl-2-pyrrolidone (NMP), 3-methoxy-3-methyl-1-butanol, or isoprene glycol, and the water-soluble organic solvent may be used in the range of 1 to 50 parts by weight, such as 10 to 40 parts by weight, based on 100 parts by weight of water. By adding NMP or DPM or 3-methoxy-3-methyl-1-butanol or isoprene glycol (a preferable amount is, for example, 1 to 20% by weight, and particularly 3 to 10% by weight, based on the composition), the stability of the composition (in particular, the emulsion) is increased. Examples of the low molecular weight monomer include methyl methacrylate, glycidyl methacrylate, and 2,2,2-trifluoroethyl methacrylate, and the low molecular weight monomer may be used in the range of 1 to 50 parts by weight, such as 10 to 40 parts by weight, based on total 100 parts by weight of the monomers.

The oil-resistant agent or the oil-resistant composition (herein, the oil-resistant agent and the oil-resistant composition are occasionally referred to as "the oil-resistant agent") is preferably in the form of a solution, an emulsion, or an aerosol. The oil-resistant agent contains a polysaccharide and a medium (e.g., a liquid medium such as an organic solvent and water).

The amount of the polysaccharide may be 1% by weight or more, 5% by weight or more, or 30% by weight or more, for example, 1 to 70% by weight or 5 to 60% by weight, based on the oil-resistant agent or the oil-resistant composition. The amount of the oil-resistant polymer may be, for example, 0 to 50% by weight, 0.1 to 40% by weight, or 1 to 30% by weight, based on the oil-resistant composition. The oil-resistant agent preferably does not contain an emulsifier.

The weight ratio of the polysaccharide to the oil-resistant polymer may be 10:90 to 98:2, for example, 40:60 to 95:5 or 55:45 to 90:10, in particular, 70:30 to 95:5, 80:20 to 93:7, especially 82:18 to 93:7 or 88:12 to 92:8.

The treatment liquid for processing paper preferably has a viscosity of 200 cps or lower, for example, of 150 cps or lower, 100 cps or lower, or 80 cps or lower at 50° C. The lower limit of the viscosity may be 1 cps.

Removal of the organic solvent in the polymer solution can be performed by heating the polymer solution (for example, to 30° C. or higher such as 50 to 120° C.) (preferably under reduced pressure).

The oil-resistant agent can be used to treat (for example, to surface-treat) the paper substrate. In the present disclosure, surface treatment (external addition) is preferable.

The oil-resistant agent can be applied to the treatment target by a conventionally known method. Usually, a method is employed in which the oil-resistant agent is diluted by being dispersed in an organic solvent or water, attached to the surface of the treatment target by a known method such as dip coating, spray coating, or foam coating, and then dried (surface treatment).

Examples of the treatment-target paper substrate include paper, a container made of paper, and a molded article made of paper (for example, molded pulp). A food packaging material and a food container are preferable.

The polysaccharide and the oil-resistant polymer favorably adhere to the paper substrate.

Paper can be produced by a conventionally known papermaking method. An internal treatment method in which the oil-resistant agent is added to a pulp slurry before papermaking, or an external treatment method in which the oil-resistant agent is applied to paper after papermaking, can be used. The method of treatment with the oil-resistant agent in the present disclosure is preferably an external treatment method.

Size presses for the external treatment method can also be classified in accordance with the coating mode as follows.

One coating mode is a so-called pond-type two-roll size press in which a coating liquid (a sizing liquid) is supplied to a nip part formed when paper is passed between two rubber rolls to create a coating liquid reserve called a pond, and the paper is passed through this coating liquid reserve to apply the sizing liquid to both surfaces of the paper. Another coating mode is a gate roll-type size press and a rod metering size press in which the sizing liquid is applied by being surface-transferred. In the pond-type two-roll size press, the sizing liquid likely reaches the inside of paper, and in the surface transfer type, the sizing liquid components likely stay on the paper surface. With the surface transfer type, the coating layer more likely stays on the paper surface than with the pond-type two-roll size press, and a larger amount of the oil-resistant layer is formed on the surface than with the pond-type two-roll size press.

In the present disclosure, oil-resistance characteristics can be imparted to paper even when the former pond-type two-roll size press is used.

Paper thus treated, after rough drying at room temperature or high temperature, is optionally subjected to a heat treatment that can have a temperature range of up to 300° C., such as up to 200° C., and in particular 80° C. to 180° C., depending on the properties of the paper, and thus shows excellent oil-resistance and water-resistance.

The present disclosure can be used in gypsum board base paper, coated base paper, wood containing paper, commonly used liner and corrugating medium, neutral machine glazed paper, neutral liner, rustproof liner and metal laminated paper, kraft paper, and the like. The present disclosure can also be used in neutral printing writing paper, neutral coated base paper, neutral PPC paper, neutral heat sensitive paper, neutral pressure sensitive base paper, neutral inkjet paper, and neutral communication paper.

A pulp raw material may be any of bleached or unbleached chemical pulp such as kraft pulp or sulfite pulp, bleached or unbleached high yield pulp such as ground pulp, mechanical pulp, or thermomechanical pulp, and waste paper pulp such as waste newspaper, waste magazine, waste corrugated cardboard, or waste deinked paper. A mixture of the above pulp raw material and synthetic fiber of asbestos, polyamide, polyimide, polyester, polyolefin, polyvinyl alcohol, or the like can be used as well.

A sizing agent can be added to increase the water-resistance of paper. Examples of the sizing agent include cationic sizing agents, anionic sizing agents, and rosin-based sizing agents (such as acidic rosin-based sizing agents and neutral rosin-based sizing agents). The amount of the sizing agent may be 0.01 to 5% by weight based on the pulp.

If necessary, additives that are used in paper making, such as a paper strength additive, a flocculant, a fixing agent, a retention aid, a dye, a fluorescent dye, a slime control agent, and an antifoaming agent, such as carboxymethyl cellulose, and polyamide polyamine-epichlorohydrin resin, can be used to such an extent that they are usually used as paper making chemicals.

If necessary, using polyvinyl alcohol, glucose, a dye, a coating color, an antislip agent, or the like, the oil-resistant agent can be applied to paper by a size press, a gate roll coater, a bill blade coater, a calender, or the like.

Polyvinyl alcohol or glucose is preferably used as an additive. Use of polyvinyl alcohol or glucose together with the polysaccharide provides high oil-resistance. The amount of the polyvinyl alcohol may be 1 to 1000 parts by weight, 2 to 200 parts by weight, 3 to 100 parts by weight, or 5 to 50 parts by weight, in particular, 10 to 40 parts by weight based on 100 parts by weight of the polysaccharide.

In external addition, the oil-resistant layer is preferably formed of the polysaccharide (and the oil-resistant polymer). The amount of the polysaccharide contained in the oil-resistant layer is preferably 0.01 to 5.0 $g/m^2$, in particular, 0.1 to 3.0 $g/m^2$, 0.1 to 2.0 $g/m^2$, or 0.1 to 1.0 $g/m^2$. The amount of the oil-resistant polymer contained in the oil-resistant layer is preferably 0.01 to 2.0 $g/m^2$, in particular, 0.1 to 1.0 $g/m^2$. The solid content of the paper oil-resistant agent in the oil-resistant layer is preferably 2 $g/m^2$ or less. The solid content of the additive, including the polyvinyl alcohol contained in the oil-resistant layer, may be 0.01 to 1.0 $g/m^2$ or 0.1 to 0.5 $g/m^2$.

In internal addition, the oil-resistant agent and pulp are preferably mixed such that the amount of the oil-resistant agent is 0.01 to 50 parts by weight or 0.01 to 30 parts by weight such as 0.01 to 10 parts by weight, and in particular 0.2 to 5.0 parts by weight, based on 100 parts by weight of pulp that forms paper.

In external and internal additions, the weight ratio of the polysaccharide to the non-fluorine copolymer may be 10:90 to 98:2, for example, 40:60 to 95:5 or 55:45 to 90:10. The weight ratio of the polysaccharide to the additive may be 70:30 to 99:1, 80:20 to 95:5, or 85:15 to 90:10.

In external addition, oil-resistance can be imparted to paper also by using a so-called pond-type two-roll size press treatment in which the treatment liquid is stored between rolls, and base paper is passed through the treatment liquid between the rolls at a given roll speed and nip pressure.

The oil-resistant polymer may be nonionic, cationic, anionic, or amphoteric. In the external treatment, the paper substrate may contain an additive such as a sizing agent, a paper strength additive, a flocculant, a retention aid, or a coagulant. The additive may be nonionic, cationic, anionic, or amphoteric. The ionic charge density of the additive is −10,000 to 10,000 μeq/g and preferably −4,000 to 8,000 μeq/g, and more preferably may be −1,000 to 7,000 μeq/g. Additives (solids or active components) such as a sizing agent, a paper strength additive, a flocculant, a retention aid, or a coagulant can be used, in general, in an amount of 0.1 to 10% by weight (such as 0.2 to 5.0% by weight) based on the pulp. In the case of a paper substrate containing a cationic additive (such as a sizing agent, a paper strength additive, a flocculant, a retention aid, or a coagulant), the oil-resistant agent is preferably anionic.

In the internal treatment, a pulp slurry having a pulp concentration of 0.5 to 5.0% by weight (such as 2.5 to 4.0% by weight) is preferably formed into paper.

Examples of the additive (such as a sizing agent, a paper strength additive, a flocculant, a retention aid, or a coagulant) include polyvinyl alcohol, alkyl ketene dimer, alkenyl succinic anhydride, a styrenic polymer (a styrene/maleic acid polymer, a styrene/acrylic acid polymer), a urea-formaldehyde polymer, polyethyleneimine, a melamine-formaldehyde polymer, a polyamideamine-epichlorohydrin polymer, a polyacrylamide polymer, a polyamine-type polymer, polydiallyldimethylammonium chloride, an alkylamine-epichlorohydrin condensate, a condensate of alkylene dichloride and polyalkylene polyamine, a dicyandiamide-formalin condensate, a dimethyldiallylammonium chloride polymer, and an olefin/maleic anhydride polymer.

In the present disclosure, the treatment target is treated with the oil-resistant agent. The "treatment" means that the oil-resistant agent is applied to the treatment target by dipping, spraying, coating, or the like. By the treatment, polysaccharides and the non-fluorine copolymer, which is the active component of the oil-resistant agent, reaches the inside of the treatment target and/or adheres to the surface of the treatment target.

EXAMPLES

Next, the present disclosure will now be described in detail by way of Examples, Comparative Examples, and Test Examples. However, the description of these does not limit the present disclosure. Below, a part, %, and a ratio indicate a part by weight, % by weight, and a weight ratio, respectively, unless otherwise specified.

The test methods used below are as follows.

Viscosity of Treatment Liquid

A rotational viscometer (type B), in which a rotating body has resistance (viscous resistance) from fluid and the resistance is read from rotational torques or the like, was used to measure viscosity (cps).

Oil-Resistance (KIT)

Oil-resistance (the KIT method) was measured in accordance with TAPPI T-559 cm-02. The KIT test liquid is a test liquid obtained by mixing castor oil, toluene, and heptane in a ratio shown in Table 1. One droplet of a test liquid shown in Table 1 was placed on paper, and the state of oil penetration was observed after 15 seconds. The highest point of oil-resistivity provided by the KIT test liquid that showed no penetration was regarded as oil-resistance. The greater the number of the KIT test liquid, the higher the oil-resistance.

TABLE 1

| | Mixing ratio (vol %) | | |
|---|---|---|---|
| Oil-resistance (KIT test liquid) | Castor oil | Toluene | Heptane |
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 45 | 55 |
| 12 | 0 | 50 | 50 |

Synthesis Example 1

A reactor having a volume of 500 ml and equipped with a stirrer, a thermometer, a reflux condenser, a dropping funnel, a nitrogen inlet, and a heater was provided, and 100 parts of a methyl ethyl ketone (MEK) solvent was added. Subsequently, while the solvent was stirred, a monomer composed of 78 parts of stearic acid amide ethyl acrylate (C18AmEA, melting point: 70° C.), 16 parts of hydroxyethyl acrylate (HEA), and 6 parts of dimethylaminoethyl methacrylate (DM) (the monomer being 100 parts in total) as well as 1.2 parts of a perbutyl PV (PV) initiator were added in this order, and the mixture was mixed by being stirred for 12 hours in a nitrogen atmosphere at 65 to 75° C. to carry out copolymerization. The solid content concentration of the resulting copolymer-containing solution was 50% by weight.

As a post-treatment, 142 g of a 0.4% aqueous acetic acid solution was added to 50 g of the resulting copolymer solution and dispersed, then MEK was distilled off under reduced pressure while heating the mixture by using an evaporator, and thus a milky white water dispersion of a copolymer was obtained (the content of the volatile organic solvent was 1% by weight or less). Moreover, ion-exchanged water was added to the water dispersion, and thus a water dispersion having a solid content concentration of 15% by weight was obtained.

The melting point of the copolymer was 64° C.

When the molecular weight of the resulting copolymer was analyzed by gel permeation chromatography, the weight average molecular weight in terms of polystyrene was 900,000.

Example 1

As wood pulp, a pulp slurry was prepared that had a weight ratio of LBKP (leaf bleached kraft pulp) and NBKP (needle bleached kraft pulp) of 60% by weight and 40% by weight and a pulp freeness (Canadian Standard Freeness) of 400 ml, a paper wet strength additive in a solid content concentration of 0.5% by weight based on the dry pulp was added to this pulp slurry, and paper having a paper density of 0.58 $g/cm^3$ and a basis weight of 45 $g/m^2$ made by a fourdrinier paper machine was used as base paper for an external treatment (a size press treatment). This base paper had an oil resistance (a KIT value) of 0 and a water-resistance (a Cobb value) of 52 $g/m^2$.

Using the water dispersion of a copolymer obtained in Synthesis Example 1 as an oil-resistant agent, oil-resistant paper (processed paper) was obtained according to the following formulation.

The treatment liquid was prepared such that the solid content concentration of the water dispersion of a copolymer obtained in Synthesis Example 1 was 1.5% by weight and the solid content concentration of starch was 7%, treated by a size press, and then dried by a drum dryer, and thus oil-resistant paper (processed paper) was obtained. The amount of solids of the applied starch and copolymer of the resulting oil-resistant paper was 0.8 $g/m^2$ (the amount of the applied copolymer was 0.14 $g/m^2$) Using the resulting base paper as test paper, the Kit test was performed. The evaluation results are shown in Table 2.

The starch used in the description was hydroxyethylated modified starch (viscosity at 10% by weight and 50° C.: 11 cps). The size press treatment (using a size press machine manufactured by Mathis) in the description is a so-called pond-type two-roll size press treatment in which the treatment liquid was stored between rolls, and the base paper was passed through the treatment liquid between rolls at a given roll speed and nip pressure.

Example 2

The same treatment as in Example 1 was performed except that the starch concentration of the treatment liquid used was 10% by weight.

The amount of solids of the applied starch and copolymer of the resulting oil-resistant paper was 1.2 g/m$^2$ (the amount of the applied copolymer was 0.16 g/m$^2$) The results of the Kit test are shown in Table 2.

Example 3

The same treatment as in Example 1 was performed except that the starch concentration of the treatment liquid used was 14% by weight. The amount of solids of the applied starch and copolymer of the resulting oil-resistant paper was 1.8 g/m$^2$ (the amount of the applied copolymer was 0.17 g/m$^2$). The results of the Kit test are shown in Table 2.

Example 4

The same treatment as in Example 1 was performed except that oxidized starch (viscosity at 10% by weight and 50° C.: 26 cps) was used in place of hydroxyethylated modified starch of Example 1. The amount of solids of the applied starch and copolymer of the resulting oil-resistant paper was 0.8 g/m$^2$ (the amount of the applied copolymer was 0.14 g/m$^2$). The results of the Kit test are shown in Table 2.

Example 5

The same treatment as in Example 1 was performed except that octenylsuccinated modified starch (viscosity at 10% by weight and 50° C.: 7 cps) was used in place of hydroxyethylated modified starch of Example 1. The amount of solids of the applied starch and copolymer of the resulting oil-resistant paper was 0.8 g/m$^2$ (the amount of the applied copolymer was 0.14 g/m$^2$). The results of the Kit test are shown in Table 2.

Example 6

The same treatment as in Example 5 was performed except that the starch concentration of the treatment liquid used was 14% by weight. The amount of solids of the applied starch and copolymer of the resulting oil-resistant paper was 1.8 g/m$^2$ (the amount of the applied copolymer was 0.17 g/m$^2$). The results of the Kit test are shown in Table 2.

Example 7

The same treatment as in Example 1 was performed except that 30% by weight of dextrin (viscosity at 10% by weight and 50° C.: 3 cps) was used in place of hydroxyethylated modified starch of Example 1. The amount of solids of the applied starch and copolymer of the resulting oil-resistant paper was 4.0 g/m$^2$ (the amount of the applied copolymer was 0.19 g/m$^2$). The results of the Kit test are shown in Table 2.

Example 8

The same treatment as in Example 1 was performed except that 5% by weight of cationized modified starch (viscosity at 10% by weight and 50° C.: 80 cps) was used in place of hydroxyethylated modified starch of Example 1. The amount of solids of the applied starch and copolymer of the resulting oil-resistant paper was 0.6 g/m$^2$ (the amount of the applied copolymer was 0.15 g/m$^2$). The results of the Kit test are shown in Table 2.

Example 9

The same treatment as in Example 1 was performed except that 2% by weight of polyvinyl alcohol was added to Example 1. The amount of solids of the applied starch and copolymer of the resulting oil-resistant paper was 1.2 g/m$^2$ (the amount of the applied copolymer was 0.17 g/m$^2$). The results of the Kit test are shown in Table 2.

Example 10

The same treatment as in Example 1 was performed except that 7% by weight of octenylsuccinate-modified starch was added to Example 1. The amount of solids of the applied starch and copolymer of the resulting oil-resistant paper was 1.9 g/m$^2$ (the amount of the applied copolymer was 0.18 g/m$^2$). The results of the Kit test are shown in Table 2.

Example 11

The same treatment as in Example 10 was performed except that no copolymer was used. The amount of applied solids of the resulting oil-resistant paper was 1.8 g/m$^2$. The results of the Kit test are shown in Table 2.

Example 12

The same treatment as in Example 1 was performed except that 25% by weight of pregelatinized starch A (viscosity at 25% by weight and 50° C.: 41 cps) was used in place of hydroxyethylated modified starch of Example 1. The amount of solids of the applied starch and copolymer of the resulting oil-resistant paper was 1.9 g/m$^2$ (the amount of the applied copolymer was 0.11 g/m$^2$). The results of the Kit test are shown in Table 2.

Example 13

The same treatment as in Example 1 was performed except that 30% by weight of pregelatinized starch B (viscosity at 30% by weight and 50° C.: 22 cps) was used in place of hydroxyethylated modified starch of Example 1. The amount of solids of the applied starch and copolymer of the resulting oil-resistant paper was 2.1 g/m$^2$ (the amount of the applied copolymer was 0.10 g/m$^2$). The results of the Kit test are shown in Table 2.

Example 14

The same treatment as in Example 3 was performed except that 10% by weight of glucose was added to Example 3. The amount of solids of the applied starch and copolymer of the resulting oil-resistant paper was 1.9 g/m$^2$ (the amount of the applied copolymer was 0.14 g/m$^2$) The results of the Kit test are shown in Table 2.

TABLE 2

| | | | Ex. 1 | Ex. 2 | Ex. 3 | Ex. 4 | Ex. 5 | Ex. 6 |
|---|---|---|---|---|---|---|---|---|
| Composition of treatment liquid | | Copolymer | 1.5% | 1.5% | 1.5% | 1.5% | 1.5% | 1.5% |
| | | Hydroxyethylated modified starch | 7% | 10% | 14% | | | |
| | | Oxidized starch | | | | 7% | | |
| | | Octenylsuccinate-modified starch | | | | | 7% | 14% |
| | | Weight % of total solids | 8.5% | 11.5% | 15.5% | 8.5% | 8.5% | 15.5% |
| Viscosity of treatment liquid | | (cps/50° C.) | 6 | 10 | 43 | 20 | 25 | 47 |
| Treated paper | Oil-resistance characteristics | KIT | 4 | 5 | 6 | 4 | 3 | 4 |
| | Copolymer | ($g/m^2$) | 0.14 | 0.16 | 0.17 | 0.14 | 0.14 | 0.17 |
| | Total amount applied | ($g/m^2$) | 0.8 | 1.2 | 1.8 | 0.8 | 0.8 | 1.8 |

| | | | Ex. 7 | Ex. 8 | Ex. 9 | Ex. 10 | Ex. 11 |
|---|---|---|---|---|---|---|---|
| Composition of treatment liquid | | Copolymer | 1.5% | 1.5% | 1.5% | 1.5% | 0.0% |
| | | Hydroxyethylated modified starch | | | 7% | 7% | 7% |
| | | Oxidized starch | | | | | |
| | | Octenylsuccinate-modified starch | | | | 7% | 7% |
| | | Dextrin | 30% | | | | |
| | | Cationized modified starch | | 5% | | | |
| | | Polyvinyl alcohol | | | 2% | | |
| | | Weight % of total solids | 31.5% | 6.5% | 10.5% | 15.5% | 14.0% |
| Viscosity of treatment liquid | | (cps/50° C.) | 22 | 128 | 30 | 60 | 53 |
| Treated paper | Oil-resistance characteristics | KIT | 5 | 4 | 7 | 7 | 4 |
| | Copolymer | ($g/m^2$) | 0.19 | 0.15 | 0.17 | 0.18 | 0.0 |
| | Total amount applied | ($g/m^2$) | 4.0 | 0.6 | 1.2 | 1.9 | 1.8 |

| | | | Ex. 12 | Ex. 13 | Ex. 14 |
|---|---|---|---|---|---|
| Composition of treatment liquid | | Copolymer | 1.5% | 1.5% | 1.5% |
| | | Hydroxyethylated modified starch | | | 14% |
| | | Pregelatinized starch A | 25% | | |
| | | Pregelatinized starch B | | 30% | |
| | | Glucose | | | 5% |
| | | Weight % of total solids | 26.5% | 31.5% | 20.5% |
| Viscosity of treatment liquid | | (cps/50° C.) | 41 | 47 | 51 |
| Treated paper | Oil-resistance characteristics | KIT | 5 | 7 | 7 |
| | Copolymer | ($g/m^2$) | 0.11 | 0.10 | 0.14 |
| | Total amount applied | ($g/m^2$) | 1.9 | 2.1 | 1.9 |

INDUSTRIAL APPLICABILITY

The oil-resistant agent and oil-resistant composition of the present disclosure is applicable to paper for use in a food container and a food packaging material.

Examples of embodiments in the present disclosure are as follows:

Embodiment 1

An oil-resistant composition comprising (1) a polysaccharide and (2) an oil-resistant polymer.

Embodiment 2

The oil-resistant composition according to embodiment 1, wherein the oil-resistant polymer (2) is a non-fluorine copolymer having:

(a) a repeating unit formed from an acrylic monomer having a long-chain hydrocarbon group having 7 to 40 carbon atoms, and (b) a repeating unit formed from an acrylic monomer having a hydrophilic group, and a weight ratio of the polysaccharide to the oil-resistant polymer is 10:90 to 98:2.

Embodiment 3

The oil-resistant composition according to embodiment 2, wherein the acrylic monomer having a long-chain hydrocarbon group (a) is a monomer represented by formula:

$$CH_2{=}C(-X^1)-C(=O)-Y^1(R^1)_k$$

wherein
- $R^1$ is each independently a hydrocarbon group having 7 to 40 carbon atoms,
- $X^1$ is a hydrogen atom, a monovalent organic group, or a halogen atom,
- $Y^1$ is a divalent to tetravalent group composed of at least one selected from a hydrocarbon group having one carbon atom, $-C_6H_4-$, $-O-$, $-C(=O)-$, $-S(=O)_2-$, or $-NH-$, provided that a hydrocarbon group is excluded, and
- k is 1 to 3.

Embodiment 4

The oil-resistant composition according to embodiment 2 or 3, wherein the acrylic monomer having a long-chain hydrocarbon group (a) is:

(a1) an acrylic monomer represented by formula:

$$CH_2{=}C(-X^2)-C(=O)-Y^2-R^2$$

wherein
- $R^2$ is a hydrocarbon group having 7 to 40 carbon atoms,
- $X^2$ is a hydrogen atom, a monovalent organic group, or a halogen atom, and
- $Y^2$ is $-O-$ or $-NH-$, and/or (a2) an acrylic monomer represented by formula:

$$CH_2{=}C(-X^3)-C(=O)-Y^3-Z(-Y^4-R^3)_n$$

wherein
- $R^3$ is each independently a hydrocarbon group having 7 to 40 carbon atoms,
- $X^3$ is a hydrogen atom, a monovalent organic group, or a halogen atom,
- $Y^3$ is $-O-$ or $-NH-$,
- $Y^4$ is each independently a group composed of at least one selected from a direct bond, $-O-$, $-C(=O)-$, $-S(=O)_2-$, $-NH-$, or $-CH_2-$,
- Z is a direct bond or a divalent or trivalent hydrocarbon group having 1 to 5 carbon atoms, and
- n is 1 or 2; and the acrylic monomer having a hydrophilic group (b) is an oxyalkylene (meth)acrylate represented by formula:

$$CH_2{=}CXC(=O)-Y^{11}-(RO)_n\text{-}A$$

wherein
- $X^{11}$ is a hydrogen atom or a methyl group,
- $Y^{11}$ is $-O-$ or $-NH-$,
- R is an alkylene group having 2 to 6 carbon atoms,
- A is a hydrogen atom, an unsaturated or saturated hydrocarbon group having 1 to 22 carbon atoms, or $CH_2{=}CX^{12}C(=O)-$, wherein $X^{12}$ is a hydrogen atom or a methyl group, and
- n is an integer of 1 to 90.

Embodiment 5

The oil-resistant composition according to any one of embodiments 1 to 4, further comprising a liquid medium that is water or a mixture of water and an organic solvent.

Embodiment 6

A paper oil-resistant agent comprising a combination of two or more polysaccharides.

Embodiment 7

The paper oil-resistant agent according to embodiment 6, wherein at least one of the polysaccharides is hydrophobized modified starch, or at least one starch selected from the group consisting of hydroxyalkylated starch, oxidized starch, alkenylsuccinated starch, dextrin, cationized starch, and pregelatinized starch, and the paper oil-resistant agent is used for external addition to paper.

Embodiment 8

A treatment liquid formed from the oil-resistant composition according to any one of embodiments 1 to 5 or the paper oil-resistant agent according to embodiment 6 or 7 and water, and having a viscosity of 200 cps or lower.

Embodiment 9

The treatment liquid according to embodiment 8, which is used for forming an oil-resistant layer.

Embodiment 10

The treatment liquid according to embodiment 8 or 9, wherein an amount of the polysaccharide is 5% by weight or more.

Embodiment 11

The treatment liquid according to any one of embodiments 8 to 10, further comprising an additive.

Embodiment 12

The treatment liquid according to embodiment 11, wherein the additive is at least one selected from polyvinyl alcohol and glucose.

Embodiment 13

Oil-resistant paper having an oil-resistant layer formed from the oil-resistant composition according to any one of embodiments 1 to 5 or the paper oil-resistant agent according to embodiment 6 or 7 on a surface of the paper.

Embodiment 14

The oil-resistant paper according to embodiment 13, which is a food packaging material or a food container.

Embodiment 15

A paper treating method comprising treating paper with the oil-resistant composition according to any one of embodiments 1 to 5 or the paper oil-resistant agent according to embodiment 6 or 7 by an external treatment or an internal treatment.

What is claimed is:

1. An oil-resistant composition comprising
(1) at least one polysaccharide selected from the group consisting of hydrophobized modified starch having a hydrophobic group that is a hydrocarbon having 3 to 40 carbon atoms, oxidized starch, dextrin, and pregelatinized starch; and
(2) an oil-resistant polymer that is a non-fluorine copolymer having:
(a) a repeating unit formed from an acrylic monomer having a long-chain hydrocarbon group having 7 to 40 carbon atoms, and
(b) a repeating unit formed from an acrylic monomer having a hydrophilic group,
wherein a weight average molecular weight of the non-fluorine copolymer is 900,000 to 10,000,000.

2. The oil-resistant composition according to claim 1, wherein a weight ratio of the polysaccharide (1) to the oil-resistant polymer (2) is 10:90 to 98:2.

3. The oil-resistant composition according to claim 1, wherein the acrylic monomer having a long-chain hydrocarbon group (a) is a monomer represented by formula:

$$CH_2{=}C(—X^1)—C({=}O)—Y^1(R^1)_k$$

wherein
$R^1$ is each independently a hydrocarbon group having 7 to 40 carbon atoms,
$X^1$ is a hydrogen atom, a monovalent organic group, or a halogen atom,
$Y^1$ is a divalent to tetravalent group composed of at least one selected from a hydrocarbon group having one carbon atom, $—C_6H_4—$, —O—, —C(=O)—, $—S({=}O)_2—$, or —NH—, provided that a hydrocarbon group is excluded, and
k is 1 to 3.

4. The oil-resistant composition according to claim 1, wherein the acrylic monomer having a long-chain hydrocarbon group (a) is:
(a1) an acrylic monomer represented by formula:

$$CH_2{=}C(—X^2)—C({=}O)—Y^2—R^2$$

wherein
$R^2$ is a hydrocarbon group having 7 to 40 carbon atoms,
$X^2$ is a hydrogen atom, a monovalent organic group, or a halogen atom, and
$Y^2$ is —O— or —NH—, and/or
(a2) an acrylic monomer represented by formula:

$$CH_2{=}C(—X^3)—C({=}O)—Y^3—Z(—Y^4—R^3)_n$$

wherein
$R^3$ is each independently a hydrocarbon group having 7 to 40 carbon atoms,
$X^3$ is a hydrogen atom, a monovalent organic group, or a halogen atom,
$Y^3$ is —O— or —NH—,
$Y^4$ is each independently a group composed of at least one selected from a direct bond, —O—, —C(=O)—, $—S({=}O)_2—$, —NH—, or $—CH_2—$,
Z is a direct bond or a divalent or trivalent hydrocarbon group having 1 to 5 carbon atoms, and
n is 1 or 2; and
the acrylic monomer having a hydrophilic group (b) is an oxyalkylene (meth)acrylate represented by formula:

$$CH_2{=}CX^{11}C({=}O)—Y^{11}—(RO)_n\text{-}A$$

wherein
$X^{11}$ is a hydrogen atom or a methyl group,
$Y^{11}$ is —O— or —NH—,
R is an alkylene group having 2 to 6 carbon atoms,
A is a hydrogen atom, an unsaturated or saturated hydrocarbon group having 1 to 22 carbon atoms, or $CH_2{=}CX^{11}C({=}O)—$, wherein $X^{11}$ is a hydrogen atom or a methyl group, and
n is an integer of 1 to 90.

5. The oil-resistant composition according to claim 1, wherein the long-chain hydrocarbon group has 12 to 30 carbon atoms.

6. A treatment liquid formed from the oil-resistant composition according to claim 1 and water, and having a viscosity of 200 cps or lower.

7. An oil-resistant paper having an oil-resistant layer formed from the oil-resistant composition according to claim 1 on a surface of the paper.

8. A paper treating method comprising treating paper with the oil-resistant composition according to claim 1 by an external treatment or an internal treatment.

9. The oil-resistant composition according to claim 1, wherein
a weight ratio of the polysaccharide (1) to the oil-resistant polymer (2) is 80:20 to 93:7.

10. The oil-resistant composition according to claim 9, wherein the acrylic monomer having a long-chain hydrocarbon group (a) is:
(a1) an acrylic monomer represented by formula:

$$CH_2{=}C(—X^2)—C(—O)—Y^2—R^2$$

wherein
$R^2$ is a hydrocarbon group having 7 to 40 carbon atoms,
$X^2$ is a hydrogen atom, a monovalent organic group, or a halogen atom, and
$Y^2$ is —O— or —NH—, and/or
(a2) an acrylic monomer represented by formula:

$$CH_2{=}C(—X^3)—C({=}O)—Y^3—Z(—Y^4—R^3)_n$$

wherein
$R^3$ is each independently a hydrocarbon group having 7 to 40 carbon atoms,
$X^3$ is a hydrogen atom, a monovalent organic group, or a halogen atom,
$Y^3$ is —O— or —NH—,
$Y^4$ is each independently a group composed of at least one selected from a direct bond, —O—, —C(=O)—, $—S({=}O)_2—$, —NH—, or $—CH_2—$,
Z is a direct bond or a divalent or trivalent hydrocarbon group having 1 to 5 carbon atoms, and
n is 1 or 2; and
the acrylic monomer having a hydrophilic group (b) is an oxyalkylene (meth)acrylate represented by formula:

$$CH_2{=}CX^{11}C({=}O)—Y^{11}—(RO)_n\text{-}A$$

wherein
$X^{11}$ is a hydrogen atom or a methyl group,
$Y^{11}$ is —O— or —NH—,
R is an alkylene group having 2 to 6 carbon atoms,
A is a hydrogen atom, an unsaturated or saturated hydrocarbon group having 1 to 22 carbon atoms, or $CH_2{=}CX^{11}C({=}O)—$, wherein $X^{11}$ is a hydrogen atom or a methyl group, and
n is an integer of 1 to 90.

11. The oil-resistant composition according to claim 9, wherein the long-chain hydrocarbon group has 12 to 30 carbon atoms.

12. A treatment liquid formed from the oil-resistant composition according to claim 9 and water, and having a viscosity of 200 cps or lower.

13. An oil-resistant paper having an oil-resistant layer formed from the oil-resistant composition according to claim 9 on a surface of the paper.

14. A paper treating method comprising treating paper with the oil-resistant composition according to claim 9 by an external treatment or an internal treatment.

15. The oil-resistant composition according to claim 1, which is configured for use in an external treatment for paper, wherein the oil-resistant composition comprises a combination of two or more of starch that is (i) a combination of two or more of a hydrophobized modified starch, or (ii) a combination of a hydrophobized modified starch and other starch wherein the hydrophobized modified starch has a hydrophobic group that is a hydrocarbon having 3 to 40 carbon atoms, wherein the other starch is selected from the group consisting of hydroxyalkylated starch, oxidized starch, dextrin, cationized starch, pregelatinized starch and etherified starch.

16. The paper oil-resistant composition according to claim 15, wherein the combination of two or more of starch is a combination of alkenylsuccinated starch and at least one of starch selected from the group consisting of hydroxyalkylated starch, oxidized starch, dextrin, cationized starch, pregelatinized starch, and etherified starch.

17. A treatment liquid formed from the oil-resistant composition according to claim 15 and water, and having a viscosity of 200 cps or lower.

18. The oil-resistant paper having an oil-resistant layer formed from the oil-resistant composition according to claim 15 on a surface of the paper.

19. A paper treating method comprising treating paper with the oil-resistant composition according to claim 15 on a surface of the paper by an external treatment or an internal treatment.

* * * * *